(12) United States Patent
Watanabe et al.

(10) Patent No.: US 6,746,796 B2
(45) Date of Patent: Jun. 8, 2004

(54) ELECTRODE-ROLLED BATTERY AND METHOD OF MANUFACTURING ELECTRODE-ROLLED BATTERY

(75) Inventors: Hideto Watanabe, Tokyo (JP); Hiromi Suzuki, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 252 days.

(21) Appl. No.: 09/989,659

(22) Filed: Nov. 21, 2001

(65) Prior Publication Data

US 2002/0068217 A1 Jun. 6, 2002

(30) Foreign Application Priority Data

Nov. 24, 2000 (JP) ........................................ 2000/358566

(51) Int. Cl.$^7$ .......................... H01M 6/10; H01M 2/26; H01M 10/04
(52) U.S. Cl. .......................... 429/94; 429/211; 29/623.1
(58) Field of Search .......................... 424/94, 161, 211; 29/623.1

(56) References Cited

U.S. PATENT DOCUMENTS 6,114,059 A * 9/2000 Watanabe et al. ......... 429/94 X
6,379,840 B2 * 4/2002 Kitoh et al. ................. 429/211
6,482,540 B1 * 11/2002 Gozdz et al. ................. 429/94
2002/0061435 A1 * 5/2002 Hisai ............................ 429/94
2002/0090545 A1 * 7/2002 Okochi et al. ................. 429/94

* cited by examiner

Primary Examiner—Stephen J. Kalafut
(74) Attorney, Agent, or Firm—Sughrue Mion, PLLC

(57) ABSTRACT

There is an electrode-rolled battery in which an anode and a cathode are rolled in a manner that a separator is put between the anode and the cathode and in which a plurality of collecting tabs is respectively provided with a plurality of cathode active material unformed parts and a plurality of anode active material forming parts; and wherein when a length of an outermost anode active material unformed part is set as "L"; and when a distance from the outermost anode active material unformed part to a center of a rolled body made up of the anode, the cathode and the separator, is set as "R", a following expression is set:

$L \geq 2\pi R.$

16 Claims, 22 Drawing Sheets

41b ;anode active material unformed part
42b ;cathode active material unformed part
α , β ;deviation 41b ;anode active material unformed part
42b ;cathode active material unformed part
α , β ;deviation

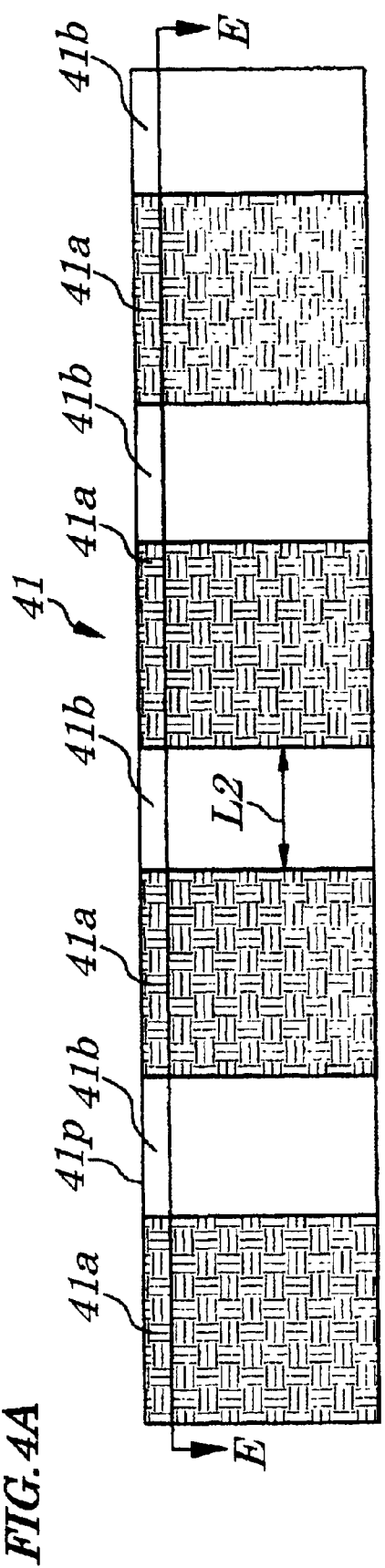
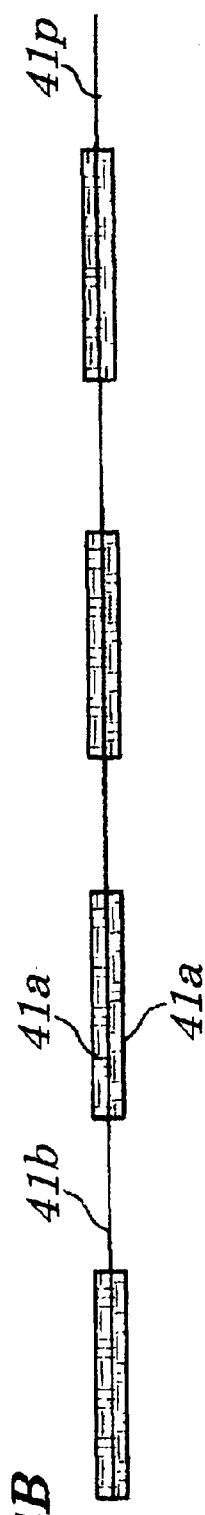
FIG. 4A
FIG. 4B

- 50 51 52 53
- 43; separator
- 42; cathode
- 41; anode
- 40

- 50 51 52 53
- F →      ← F
- 40

54;header
50,51,52,53;tab
40;rolled body 50 51 52 53
N
40

11b ;anode active material unformed part
12b ;cathode active material unformed part
d1, d2 ;deviation

ELECTRODE-ROLLED BATTERY AND METHOD OF MANUFACTURING ELECTRODE-ROLLED BATTERY

The present application claims priority of Japanese Patent Application No. 2000-358566 filed on Nov. 24, 2000, which is hereby incorporated by reference.

BACKGROUND OF THE INVENTION

1. Field of the Invention

The present invention relates to an electrode-rolled battery, and more particularly relates to an electrode-rolled battery and a method of manufacturing the electrode-rolled battery suitable to supply a large current to a load such as a battery section in an electric car.

2. Description of Related Art

As to an electrode-rolled battery such as a lithium-ion secondary battery, a band-shaped anode and a band-shaped cathode are rolled so that a separator is put between them, and current collecting tabs are connected to active material unformed parts of the anode and cathode. As to a small electrode-rolled battery having a small rated capacity, a strip-type tab is connected to each active material unformed part at each rolling start and each rolling end of the anode and the cathode. As to a large electrode-rolled battery having a large rated capacity, an anode length and a cathode length are longer than those of the small electrode-rolled battery, internal impedance becomes high so as to overheat in vicinities of the tabs since only one tab is connected to each of the cathode and the anode. Therefore, since that is a bad influence on a load characteristic and a cycle lifetime characteristic (that is, a frequency of charge/discharge cycles of the secondary battery repeatedly used until a function of a secondary battery is over), a plurality of tabs are connected to each of the cathode and the anode and a current is collected from a plurality of points.

A large electrode-rolled battery such as this type, conventionally, as shown in FIG. 12, is provided with a rolled body 10 and a plurality of tabs (a tab 20, a tab 21, a tab 22, and a tab 23). The rolled body 10 is stored in a cylindrical case (not shown). The rolled body 10 is formed by rolling a band-shaped anode 11 and a band-shaped cathode 12 so as to put a separator 13 between them. The tab 20, the tab 21, the tab 22, and the tab 23 are respectively connected to four anode active material unformed parts 11a (after mentioned) in the anode 11. Similarly, other tabs (not shown) are connected to the cathode 12.

FIG. 13A and FIG. 13B show the anode 11 in FIG. 12, and FIG. 13A is a view showing a peripheral surface viewed from an arrow A in FIG. 12 and FIG. 13B is a plan unrolled view showing the anode 11.

As shown in FIG. 13A, in the rolled body 10, a central axis is set as "O", and a radius is set as "R" when the anode active material unformed parts of the cathode 11 exist in a peripheral surface of the rolled body 10. As shown in FIG. 13B, in the anode 11, the anode active material forming parts 11a are formed in a longitudinal direction of a band-shaped current collector 11p intermittently. The tab 20, the tab 21, the tab 22, and the tab 23 are respectively connected to anode active material unformed parts 11b between the anode active material forming parts 11a. Each the anode active material unformed parts 11b is formed at regular intervals and has a regular length. A length L1 is set as follows:

$$L1 < 2\pi R.$$

Further, the tab 20, the tab 21, the tab 22, and the tab 23 are connected to a same position of each of the anode active material unformed parts 11b. The cathode 12 is formed similarly to the anode 11.

FIG. 14 is a view showing an essential part of the rolled body 10 indicated by the arrow A in FIG. 12.

In the rolled body 10, as shown in FIG. 14, the anode 11 and the cathode 12 are rolled in a rolling direction S so that a separator (not shown) is put between the anode 11 and the cathode 12. To prevent Li+ ions in the anode active material from depositing as metallic lithium between the anode 11 and the cathode 12, a deviation d1 is set between a start point of the anode active material unformed part 11b and a start point of a cathode active material unformed part 12b which is opposite to the anode active material unformed part 11b and a deviation d2 is set between an end point of the anode active material unformed part 11b and an end point of the cathode active material unformed part 12b which is opposite to the anode active material unformed part 11b.

The electrode-rolled battery is represented by, for example,

where $LiPF_6$ is lithium, PC is propylene carbonate (electrolyte) and DEC is diethyl carbonate (electrolyte). A battery reaction is represented by:

Charge

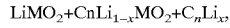

Discharge

Charge

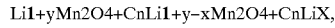

Discharge where $LiMO_2$ is lithium metallic oxide (anode active material), "M" is Co, Ni or Fe and "$C_n$" is carbon material (cathode active material).

FIG. 15A to FIG. 22 are process diagrams for explaining a method of manufacturing the electrode-rolled battery shown in FIG. 12.

Manufacturing process (1) to manufacturing process (8) of the electrode-rolled battery shown in FIG. 12 will be explained with reference to FIG. 15A to FIG. 22.

(1) Manufacturing process is shown in FIG. 15A and FIG. 15B.

As shown in FIG. 15A, anode active material forming parts 11a, are intermittently provided on one side of the band-shaped current collector 11p in the longitudinal direction. Parts except the anode active material forming parts 11a are anode active material unformed parts 11b. A length of each anode active material unformed part 11b is set to length L1. Similarly, the anode active material forming parts 11a are intermittently provided on another side of the band-shaped current collector 11p in the longitudinal direction. As shown in FIG. 15B which is a sectional view of FIG. 15A taken along a line A—A of FIG. 15A, an anode 11 is manufactured in a manner that the anode active material forming parts 11a are formed on both sides of the band-shaped current collector 11p.

(2) Manufacturing process is shown in FIG. 16A and FIG. 16B.

As shown in FIG. 16A, cathode material forming parts 12a are intermittently provided on one side of the band-shaped current collector 12p in the longitudinal direction. In this case, parts except the cathode active material forming parts 12a are cathode active material unformed parts 12b. Similarly, the cathode active material forming parts 12a are intermittently provided on another side of the band-shaped current collector 12p in the longitudinal direction. As shown in FIG. 16B which is a sectional view of FIG. 16A taken along a line B—B, a cathode 12 is manufactured in a manner that the cathode active material forming parts 12a are formed on both sides of the band-shaped current collector 12p.

(3) Manufacturing process is shown in FIG. 17.

A tab 20, a tab 21, a tab 22, and a tab 23 are respectively connected to the anode active material unformed parts 11b.

(4) Manufacturing process is shown in FIG. 18.

A tab 30, a tab 31, a tab 32, and a tab 33 are respectively connected to the cathode active material unformed parts 12b.

(5) Manufacturing process is shown in FIG. 19.

A separator 13 is put between the anode 11 and the cathode 12 and they are rolled by a rolling apparatus so as to manufacture the rolled body 10. Incidentally, the tab 30, the tab 31, the tab 32, and the tab 33 are not shown since they are pulled out from another side not a side from which the tab 20, the tab 21, the tab 22, and the tab 23 are pulled out.

(6) Manufacturing process is shown in FIG. 20.

The tab 20, the tab 21, the tab 22, and the tab 23 are gathered by a manual operation F of an operator. Similarly, the tab 30, the tab 31, the tab 32, and the tab 33 (not shown) are gathered.

(7) Manufacturing process is shown in FIG. 21.

A collecting header 24 is connected to the tab 20, the tab 21, the tab 22, and the tab 23 by manual operation of the operator, so as to perform ultrasonic welding. Similarly, a header (not shown) is connected to the tab 30, the tab 31, the tab 32, and the tab 33 (not shown). Then, the rolled body 10 is stored in a cylindrical case (not shown).

(8) Manufacturing process is shown in FIG. 22.

Electrolyte is injected by an electrolyte injecting nozzle N in a direction from which the tab 20, the tab 21, the tab 22, and the tab 23 are pulled out, and then the electrode-rolled battery is completed. Incidentally, the header 24 is not shown in FIG. 22.

FIG. 23A to FIG. 26 are process diagrams for explaining a method of manufacturing another conventional electrode-rolled battery.

Manufacturing process (1) to manufacturing process (4) of another electrode-rolled battery will be explained with reference to FIG. 23A to FIG. 26:

(1) Process is shown in FIG. 23A and FIG. 23B.

As shown in FIG. 23A, an anode active material forming part 14a is continuously provided on one side of a band-shaped current collector 14p except one end in a width direction. A part except the anode active material forming parts 14a is an anode active material unformed part 14b. Similarly, an anode active material forming part 14a is continuously provided on another side of the band-shaped current collector 14p except one end in the width direction. As shown in FIG. 23B which is a sectional view of FIG. 23A taken along a line C—C, an anode 14 is manufactured in a manner that the anode active material forming part 14a and the anode active material forming part 14a are formed on both sides of the electrode 14p.

(2) Process is shown in FIG. 24A and FIG. 24B.

As shown in FIG. 24A, a cathode active material forming part 15a is continuously provided on one side of a band-shaped electrode 15p except one end in the width direction. In this case, a part in addition to the cathode active material forming part 15a is a cathode active material unformed part 15b. Similarly, the cathode active material forming part 15a is continuously provided on another side of the band-shaped current collector 15p except one end in the width direction. As shown in FIG. 24B which is a sectional view of FIG. 24A taken along a line D—D, a cathode 15 is manufactured in a manner that the cathode active material forming part 15a and the cathode active material forming part 15a are formed on both sides of the band-shaped current collector 15p.

(3) Process is shown in FIG. 25.

The tab 20, the tab 21, the tab 22, and the tab 23 are connected to the anode active material unformed-part 14b at regular intervals.

(4) Process is shown in FIG. 26.

The tab 30, the tab 31, the tab 32, and the tab 33 are connected to the cathode active material unformed part 15b at regular intervals. Then, same processes as shown in FIG. 19 to FIG. 22 are performed.

However, there are the following problems in the above-mentioned electrode-rolled battery.

That is, since the length L1 of the anode active material unformed part 11b is shorter than $2\pi R$, it is impossible to arrange the tab 20, the tab 21, the tab 22, and the tab 23 regularly, for example, in a line. Therefore, there is a problem in that processes of gathering the tab 20, the tab 21, the tab 22, and the tab 23 and of connecting them to the header 24 (that is, processes shown in FIG. 20 and FIG. 21) are not only complicated but also it is difficult to perform these processes using an apparatus. Particularly, in a case in that the header 24 is ring-shaped or disc-shaped, when the tab 20, the tab 21, the tab 22, and the tab 23 are irregularly pulled from a plurality of positions in the end of the rolled body 10, there is a problem in that the process of connecting the header 24 to the tab 20, the tab 21, the tab 22, and the tab 23 and of performing ultrasonic welding (namely, process shown in FIG. 21) becomes difficult. Further, in the process of injecting the electrolyte (namely, the process shown in FIG. 22), the tab 20, the tab 21, the tab 22, and the tab 23 become obstacles, it is difficult to insert the electrolyte injecting nozzle N and there is a problem in that the injecting operation is complicated.

Further, since it is impossible to set positions of the tab 20, the tab 21, the tab 22, and the tab 23 freely, it is impossible to disperse the positions of the tab 20, the tab 21, the tab 22, and the tab 23 so that an internal impedance of the rolled body 10 is small, there is a case in that an internal impedance of the rolled body 10 is large. As a result, when a large current is continuously supplied from the electrode-rolled battery to a load, the rolled-body 10 heats and the electrolyte degrades, and therefore, there is a problem in that a cycle lifetime characteristic of the electrode-rolled battery degrades. Also, since it is impossible to set positions of the tab 20, the tab 21, the tab 22, and the tab 23 freely, in a case in that positions of the anode active material forming parts 11a are set so that pulling positions of the tab 20, the tab 21, the tab 22, and the tab 23 are arranged in a line in a diameter direction of the rolled body 10, the rolled body 10 is not provided with an originally-designed structure caused by parameters such as a thickness accuracy of the anode 11, a thickness accuracy of the cathode 12, and an accuracy of the rolling force of a rolling apparatus, and therefore, there is a problem in that a desired characteristic can be obtained and there is no stability in the characteristic.

Further, the anode 14 shown in FIG. 25, areas for contacting the tab 20, the tab 21, the tab 22, and the tab 23 with the anode active material unformed part 14b are smaller than the anode 11 shown in FIG. 17. Therefore, there is a problem in that the internal impedance of the rolled body 10 is large. Also, there are many cases in that the anode 14 is in a wavy form caused by differences such expansions between the anode active material forming part 14a and the anode active material unformed part 14b during the manufacturing process, and therefore, there is a case in that the anode 14 is not suitable for use. Similarly, there is a case in that the cathode 15 shown in FIG. 26 is not suitable for use.

SUMMARY OF THE INVENTION

In view of the above, it is an object of the present invention to provide an electrode-rolled battery suitable to supply a large current and manufactured by a simple process and to provide a method of manufacturing the electrode-rolled battery.

According to a first aspect of the present invention, there is provided an electrode-rolled battery in which an anode and a cathode are rolled in a manner that a separator is put between the anode and the cathode and in which a plurality of collecting tabs is respectively connected with a plurality of cathode active material unformed parts and a plurality of anode active material unformed parts; and wherein when a length of an outermost anode active material unformed part is set as "L"; and when a distance from the outermost anode active material unformed part to a center of a rolled body made up of the anode, the cathode and the separator, is set as "R", a following expression is set:

$$L \geq 2\pi R.$$

According to a second aspect of the present invention, there is provided an electrode-rolled battery in which an anode and a cathode are rolled in a manner that a separator is put between the anode and the cathode and in which a plurality of collecting tabs is respectively connected with a plurality of cathode active material unformed parts and a plurality of anode active material unformed parts; and wherein when a length of an outermost anode active material unformed part is set as "L"; and when a distance from the outermost anode active material unformed part to a center of a rolled body made up of the anode, the cathode and the separator, is set as "R", when a deviation between a start point of the outermost anode active material unformed part and a start point of a outermost cathode active material forming part which is opposite to the outermost anode active material unformed part is set as "α", and when a deviation between an end point of the outermost anode active material unformed part and an end point of the outermost cathode active material forming part which is opposite to the outermost anode active material unformed part is set as "β", a following expression is set:

$$L = 2\pi R + \alpha + \beta.$$

According to a third aspect of the present invention, there is provided an electrode-rolled battery comprising:

an anode having a first band-shaped current collector and intermittently having anode active material forming parts on both sides of the first band-shaped current collector in a longitudinal direction;

a cathode having a second band-shaped current collector and intermittently having cathode active material forming parts on both sides of the first band-shaped current collector in a longitudinal direction;

a plurality of first collecting tabs formed in the anode active material unformed parts of the first band-shaped current collector;

a plurality of second collecting tabs formed in the cathode active material unformed parts of the second band-shaped current collector; and a separator put between the cathode and the anode;

the electrode-rolled battery in which the anode, the cathode and the separator are rolled; and wherein when a length of an outermost anode active material unformed part is set as "L"; and when a distance from the outermost anode active material unformed part to a center of a rolled body made up of the anode, the cathode and the separator, is set as "R", a following expression is set:

$$L \geq 2\pi R.$$

According to a fourth aspect of the present invention, there is provided an electrode-rolled battery comprising:

an anode having a first band-shaped current collector and intermittently having anode active material forming parts on both sides of the first band-shaped current collector in a longitudinal direction;

a cathode having a second band-shaped current collector and intermittently having cathode active material forming parts on both sides of the second band-shaped current collector in a longitudinal direction;

a plurality of first collecting tabs formed in the anode active material unformed parts of the anode;

a plurality of second collecting tabs formed in the cathode active material unformed parts of the cathode; and a separator put between the cathode and the anode;

the electrode-rolled battery in which the cathode, the anode and the separator are rolled; and wherein when a length of an outermost anode active material unformed part is set as "L"; and when a distance from the outermost anode active material unformed part to a center of a rolled body made up of the anode, the cathode and the separator, is set as "R", when a deviation between a start point of the outermost anode active material unformed part and a start point of a outermost cathode active material forming part which is opposite to the outermost anode active material unformed part is set as "α", and when a deviation between an end point of the outermost anode active material unformed part and an end point of the outermost cathode active material forming part which is opposite to the outermost anode active material unformed part is set as "β", a following expression is set:

$$L = 2\pi R + \alpha + \beta.$$

In the foregoing, a preferable mode is one wherein each of the collecting tabs is arranged regularly on an end face of the rolled body.

According to a fifth aspect of the present invention, there is provided a method of manufacturing an electrode-rolled battery in which an anode and a cathode are rolled in a manner that a separator is put between the anode and the cathode and in which a plurality of collecting tabs is respectively connected with a plurality of cathode active material unformed parts and a plurality of anode active material unformed parts; and wherein when a length of an outermost anode active material unformed part is set as "L"; and when a distance from the outermost anode active material unformed part to a center of a rolled body made up of the anode, the cathode and the separator, is set as "R", a following expression is set:

$$L \geq 2\pi R.$$

According to a sixth aspect of the present invention, there is provided a method of manufacturing an electrode-rolled battery in which an anode and a cathode are rolled in a manner that a separator is put between the anode and the cathode and in which a plurality of collecting tabs is respectively connected with a plurality of anode active material unformed parts and a plurality of cathode active material unformed parts; and wherein when a length of an outermost anode active material unformed part is set as "L"; and when a distance from the outermost anode active material unformed part to a center of a rolled body made up of the anode, the cathode and the separator, is set as "R", when a deviation between a start point of the outermost anode active material unformed part and a start point of a outermost cathode active material forming part which is opposite to the outermost anode active material unformed part is set as "a", and when a deviation between an end point of the outermost anode active material unformed part and an end point of the outermost cathode active material forming part which is opposite to the outermost anode active material unformed part is set as "P", a following expression is set:

$$L=2\pi R+\alpha+\beta.$$

According to a seventh aspect of the present invention, there is provided a method of manufacturing an electrode-rolled battery comprising:

an anode forming process of forming an anode by intermittently forming anode active material forming parts on both sides of a first band-shaped current collector in a longitudinal direction;

a cathode forming process of forming a cathode by intermittently forming cathode active material forming parts on both sides of a second band-shaped current collector in a longitudinal direction;

a connecting process of connecting a plurality of first collecting tabs to anode active material unformed parts of the first band-shaped current collector and of connecting a plurality of second collecting tabs to cathode active material unformed parts of the second band-shaped current collector;

a rolling process of rolling the cathode and the anode, and a separator which is put between the cathode and the anode;

a first tab gathering process of gathering each of the first collecting tabs;

a header connecting process of connecting a collecting header to the first collecting tabs which are gathered;

a second tab gathering process of gathering each of the second collecting tabs;

an electrolyte injecting process of injecting electrolyte into the rolled body using an electrolyte injecting apparatus:

wherein when a length of an outermost anode active material unformed part is set as "L"; and when a distance from the outermost anode active material unformed part to a center of a rolled body made up of the anode, the cathode and the separator, is set as "R", a following expression is set:

$$L \geq 2\pi R.$$

According to an eighth aspect of the present invention, there is provided a method of manufacturing an electrode-rolled battery comprising:

an anode forming process of forming an anode by intermittently forming anode active material forming parts on both sides of a first band-shaped current collector in a longitudinal direction;

a cathode forming process of forming a cathode by intermittently forming cathode active material forming parts on both sides of a second band-shaped current collector in a longitudinal direction;

a connecting process of connecting a plurality of first collecting tabs to anode active material unformed parts of the first band-shaped current collector and of connecting a plurality of second collecting tabs to cathode active material unformed parts of the second band-shaped current collector;

a rolling process of rolling the cathode and the anode, and a separator which is put between the cathode and the anode;

a first tab gathering process of gathering each of the first collecting tabs;

a header connecting process of connecting a collecting header to the first collecting tabs which are gathered;

a second tab gathering process of gathering each of the second collecting tabs;

an electrolyte injecting process of injecting electrolyte into the rolled body using an electrolyte injecting apparatus; and wherein when a length of an outermost anode active material unformed part is set as "L"; and when a distance from the outermost anode active material unformed part to a center of a rolled body made up of the anode, the cathode and the separator, is set as "R", when a deviation between a start point of the outermost anode active material unformed part and a start point of a outermost cathode active material forming part which is opposite to the outermost anode active material unformed part is set as "α", and when a deviation between an end point of the outermost anode active material unformed part and an end point of the outermost cathode active material forming part which is opposite to the outermost anode active material unformed part is set as "β", a following expression is set:

$$L=2\pi R+\alpha+\beta.$$

In the foregoing, a preferable mode is one wherein each of the collecting tabs is arranged regularly on an end face of the rolled body.

According to the present invention, since a length L of the outermost anode active material unformed part is set as follows:

$$L \geq 2\pi R (\text{for example, } L=2\pi R+\alpha+\beta),$$

the first collecting tabs can be arranged regularly, for example, the first collecting tabs are pulled in a line in a diameter direction of the rolled body or are equally dispersed on the circumstance of the rolled body. Therefore, the process of gathering the first collecting tabs (first tab gathering process) and the process of connecting gathered first collecting tabs to the header (header connecting process) are made simple when compared with a conventional technique. Further, since the first collecting tabs can be arranged regularly, in the process of injecting electrolyte to the rolled body in the electrolyte injecting process, an electrolyte injecting nozzle apparatus is easily inserted, and therefore, the operation is made easier than the conventional technique.

Further, since it is possible to set the first collecting tabs at any position, it is possible to set an internal impedance of the rolled body small. Therefore, though a large current is continuously supplied from the electrode-rolled battery to a load, there is no case in that the rolled body heats and the electrolyte degrades, and therefore, a cycle lifetime characteristic of the electrode-rolled battery improves in comparison with a conventional electrode-rolled battery. Also, it is possible to set the first collecting tabs freely, and therefore, though in the anode, the anode active material forming parts are positioned so that the first collecting tabs are pulled in a line in the diameter direction of the rolled body, it is possible to manufacture the electrode-rolled battery based on an original design without influences of parameters such as thickness accuracy of the anode, thickness accuracy of the cathode, and rolling force of the rolling apparatus, to obtain a desired characteristic and to manufacture electrode-rolled batteries without characteristic deviations.

BRIEF DESCRIPTION OF THE DRAWINGS

The above and other objects, advantages, and features of the present invention will be more apparent from the following description taken in conjunction with the accompanying drawings in which:

FIG. 4A and FIG. 4B are views showing a process of manufacturing the anode 41;

DETAILED DESCRIPTION OF THE PREFERRED EMBODIMENTS

Best modes for carrying out the present invention will be described in further detail using an embodiment with reference to the accompanying drawings.

Figure 1:
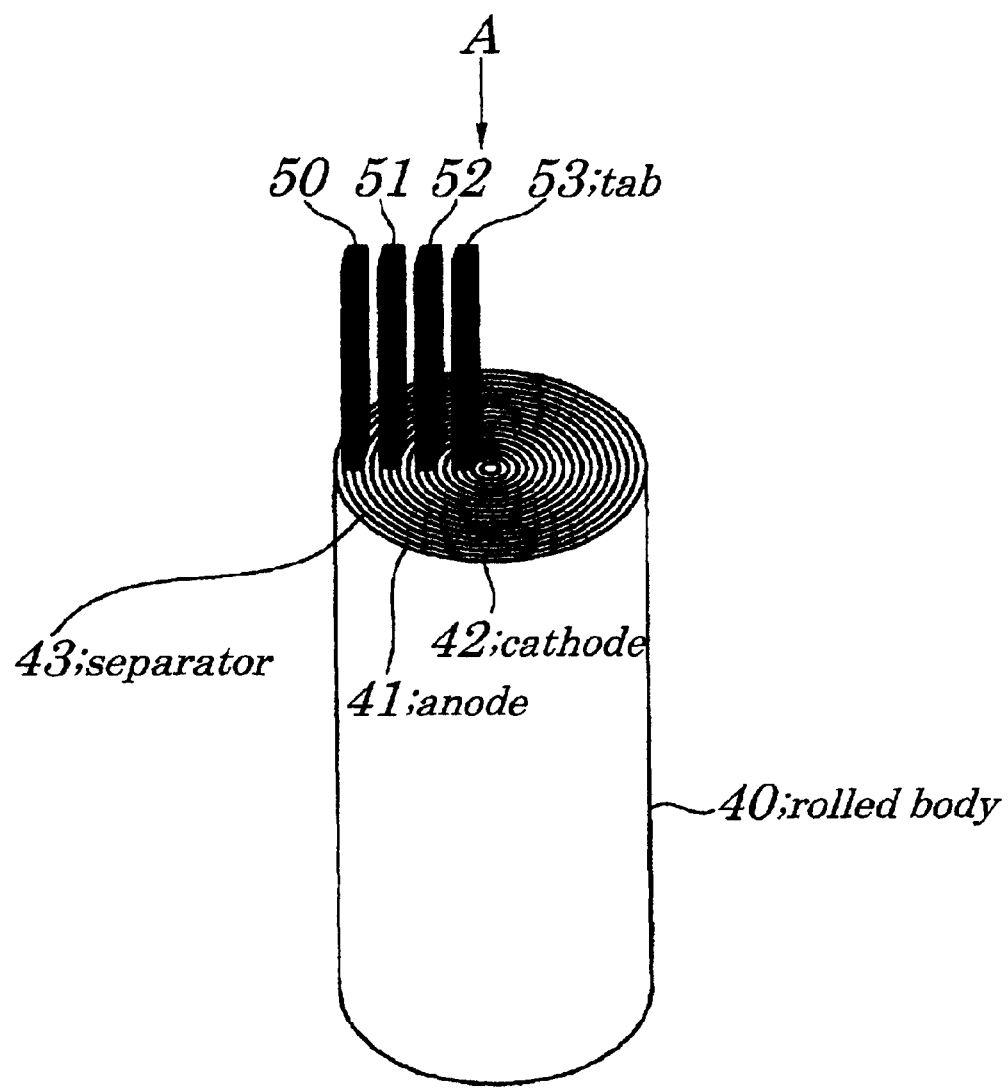
FIG. 1 is a perspective view showing an electrode-rolled battery according to an embodiment of the present invention.

FIG. 1 is a perspective view showing an electrode-rolled battery according to an embodiment of the present invention.

The electrode-rolled battery according to this embodiment, as shown in FIG. 1, is provided with a rolled body 40 and a plurality of tabs (a tab 50, a tab 51, a tab 52, and a tab 53). The rolled body 40 is stored in a cylindrical case (not shown). The rolled body 40 is made by rolling a band-shaped anode or current collector 41 (hereinafter may also be referred to as anode 41) and a band-shaped cathode or current collector 42 (hereinafter may also be referred to as cathode 42) so that a separator 43 is put between the band-shaped anode 41 and the band-shaped cathode 42. The tab 50, the tab 51, the tab 52, and the tab 53 are respectively connected to four anode active material unformed parts in the anode 41. Similarly, a plurality of tabs (not shown) is connected to the cathode 42.

Figure 2A:
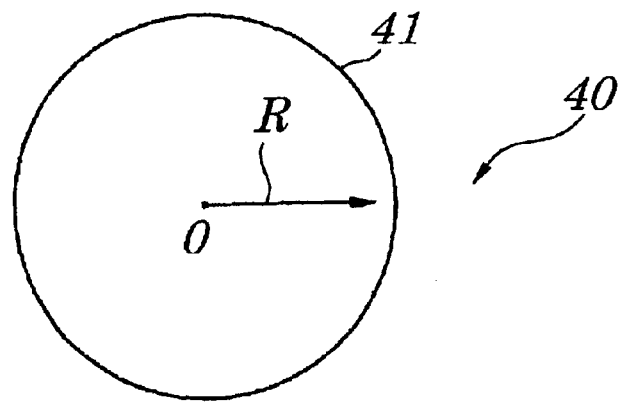
FIG. 2A and FIG. 2B are views showing an anode 41 shown in FIG. 1.
Figure 2B:
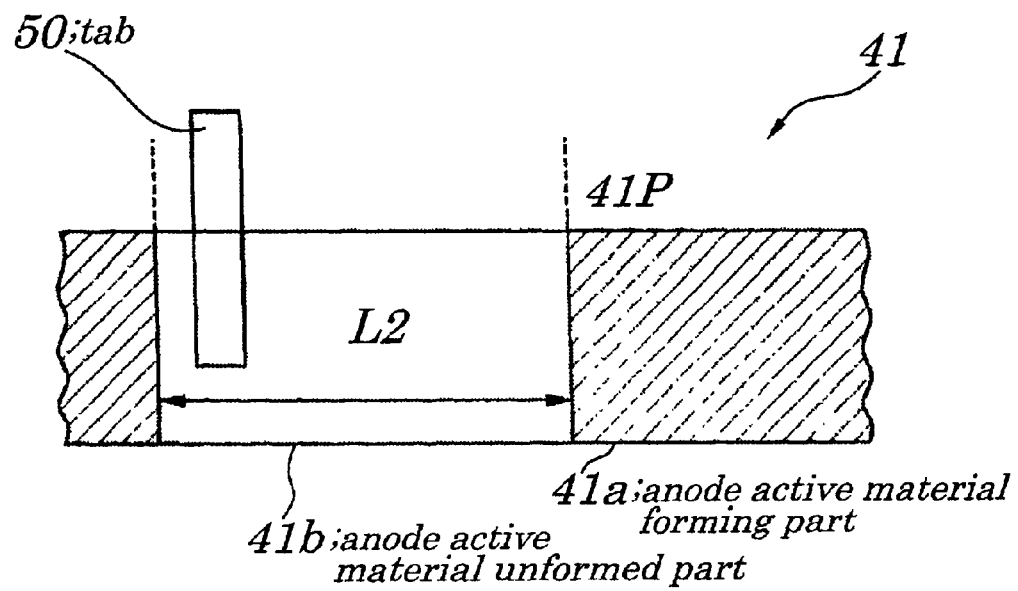

FIG. 2A and FIG. 2B are views showing the anode 41 shown in FIG. 1. FIG. 2A is a view showing a periphery of the rolled body 40 indicated from an arrow A in FIG. 1 and FIG. 2B is a plan unfolded view showing the anode 41.

Figures 16A, 16B:
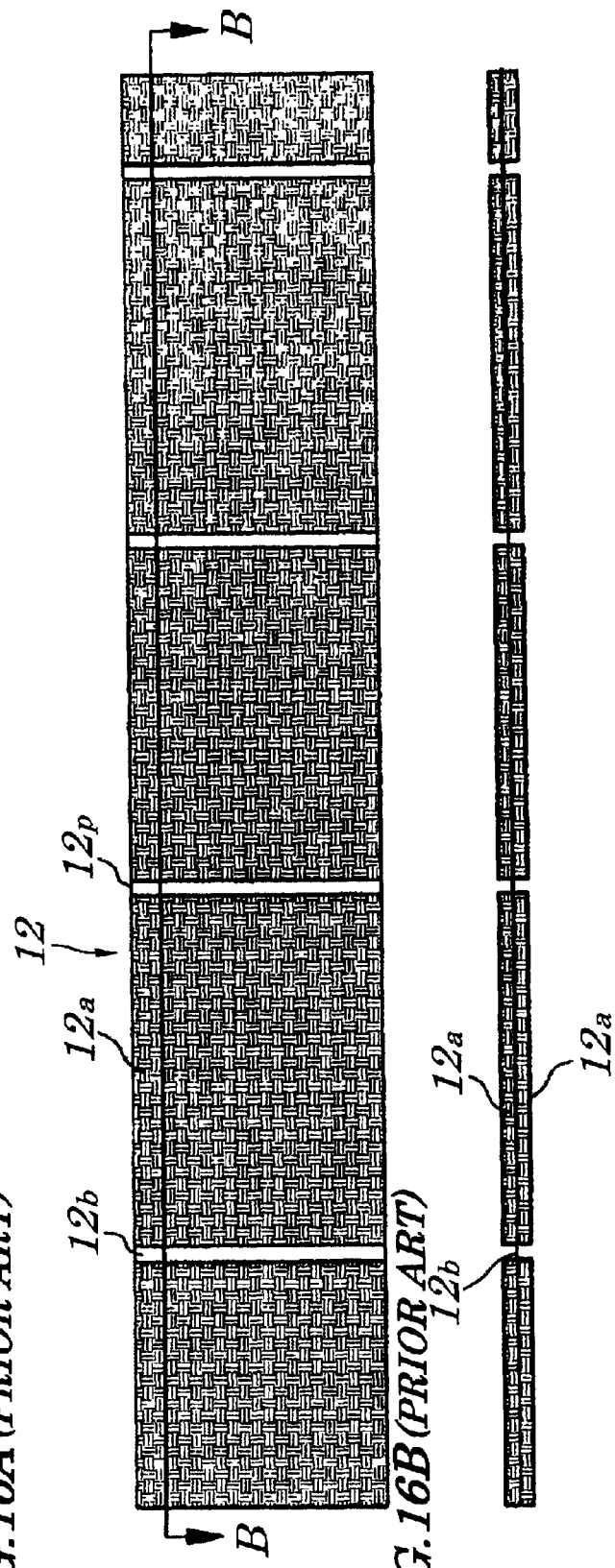
FIG. 16A and FIG. 16B are views showing a process of manufacturing the electrode-rolled battery shown in FIG. 12.
Figure 17:
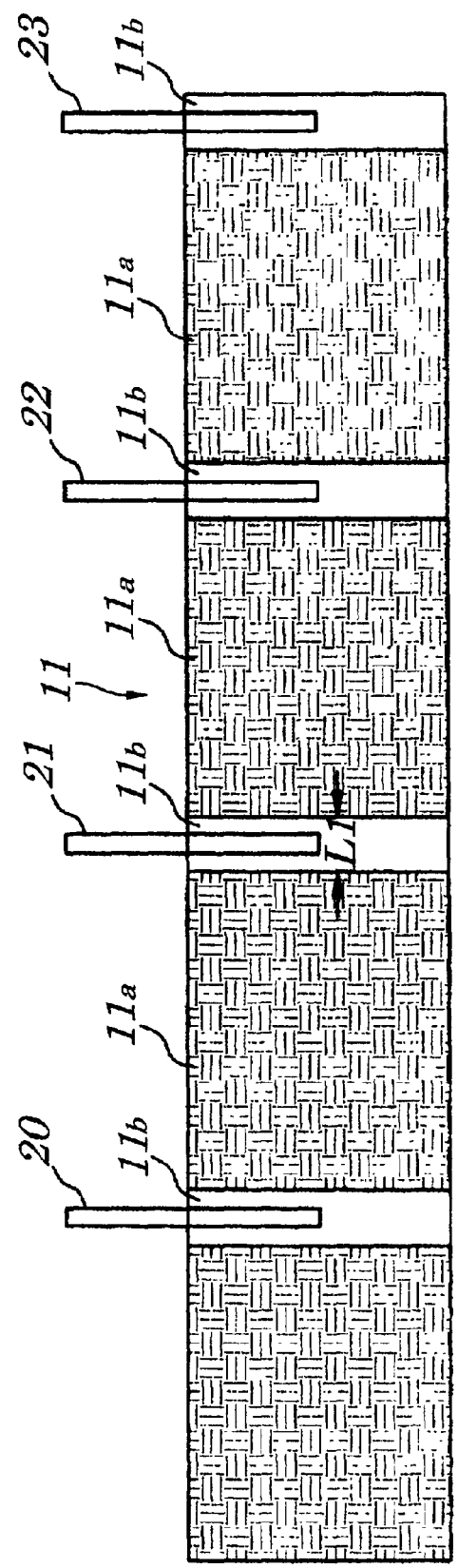
FIG. 17 is a view showing a process of manufacturing the electrode-rolled battery shown in FIG. 12.
Figure 18:
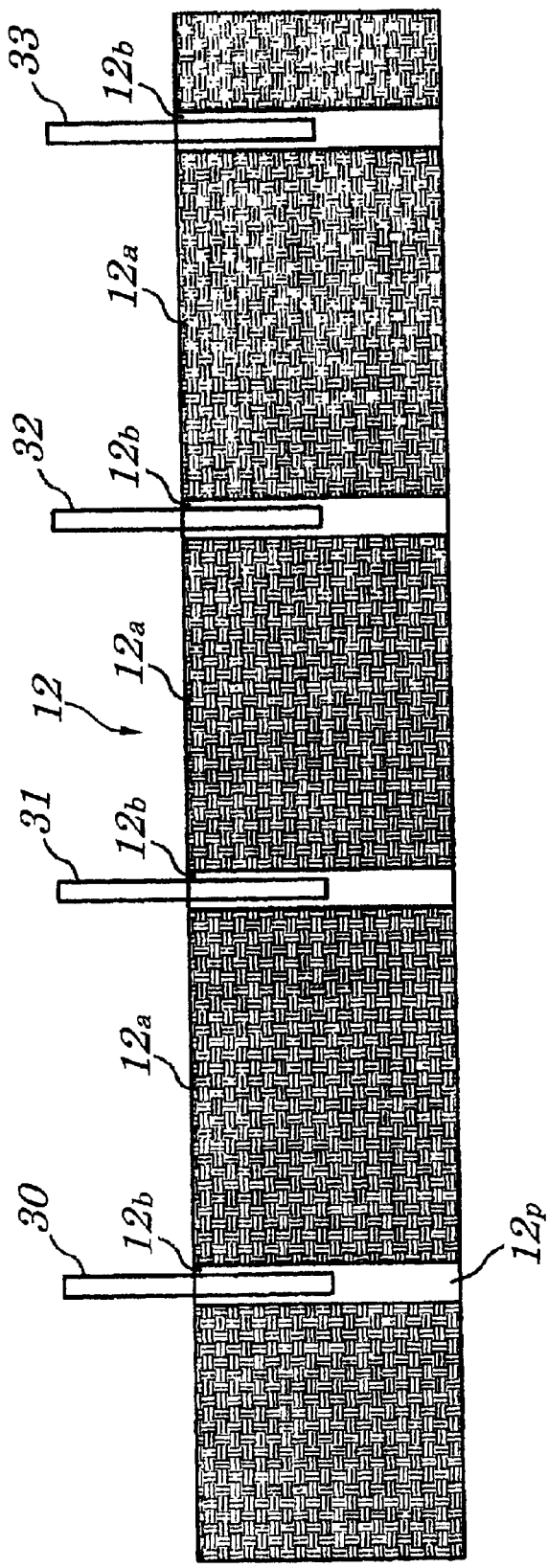
FIG. 18 is another view showing a process of manufacturing the electrode-rolled battery shown in FIG. 12.
Figure 19:
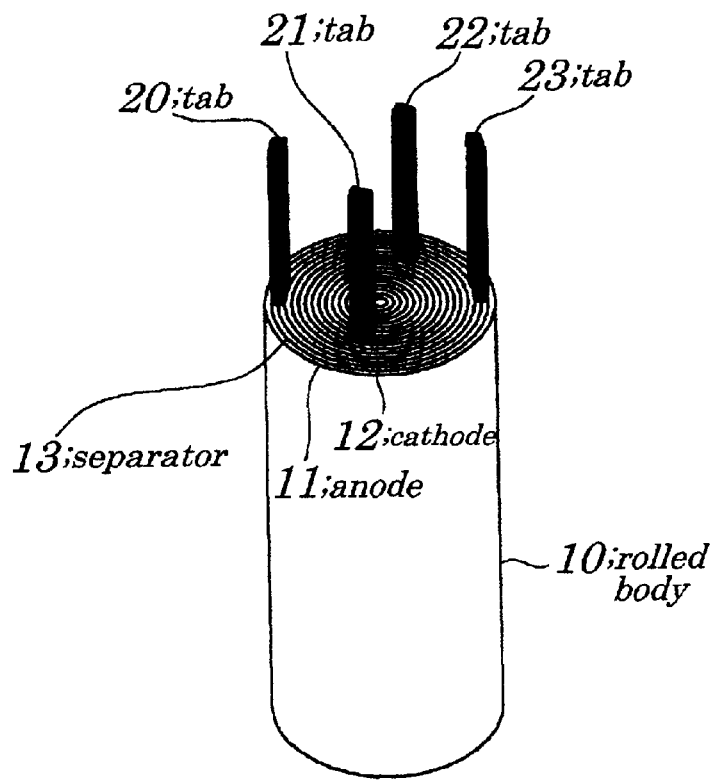
FIG. 19 is another view showing a process of manufacturing the electrode-rolled battery shown in FIG. 12.
Figure 20:
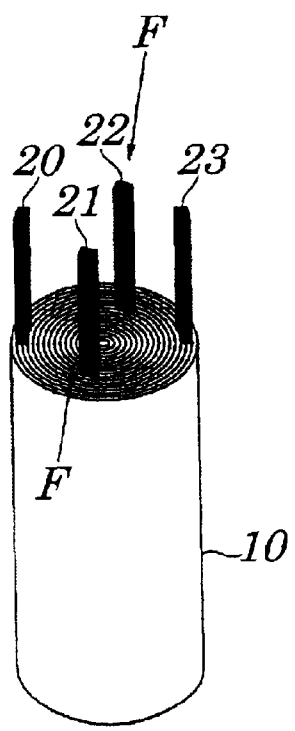
FIG. 20 is another view showing a process of manufacturing the electrode-rolled battery shown in FIG. 12.
Figure 21:
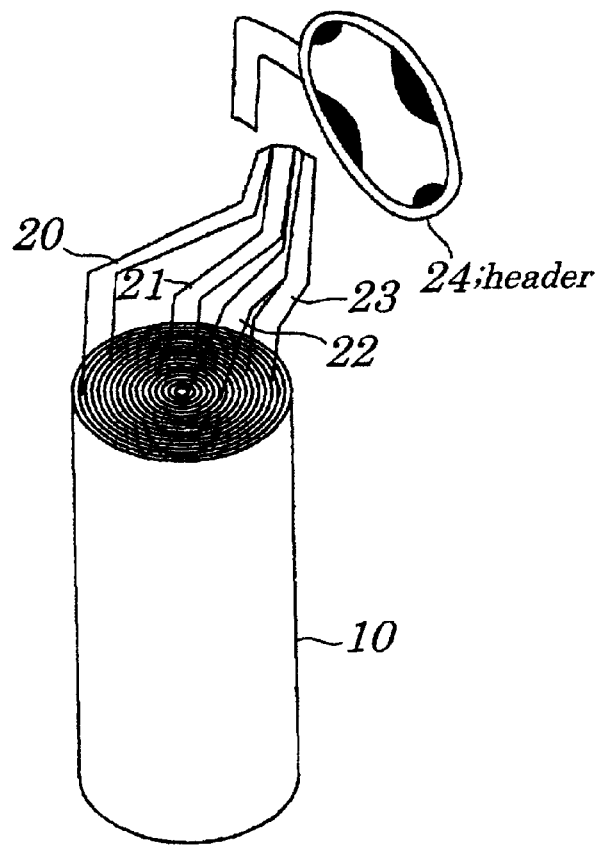
FIG. 21 is another view showing a process of manufacturing the electrode-rolled battery shown in FIG. 12.
Figure 22:
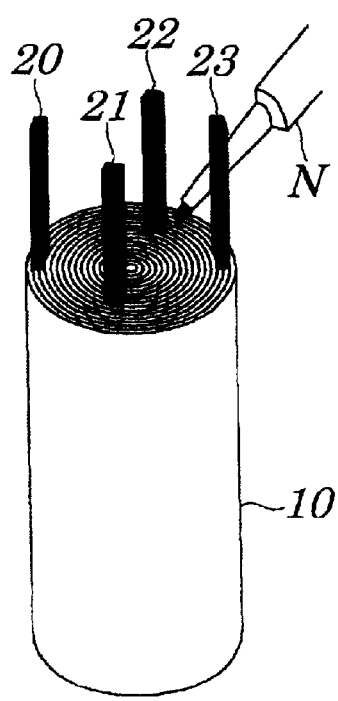
FIG. 22 is yet still another view showing a process of manufacturing the electrode-rolled battery shown in FIG. 12.
Figures 23A, 23B:
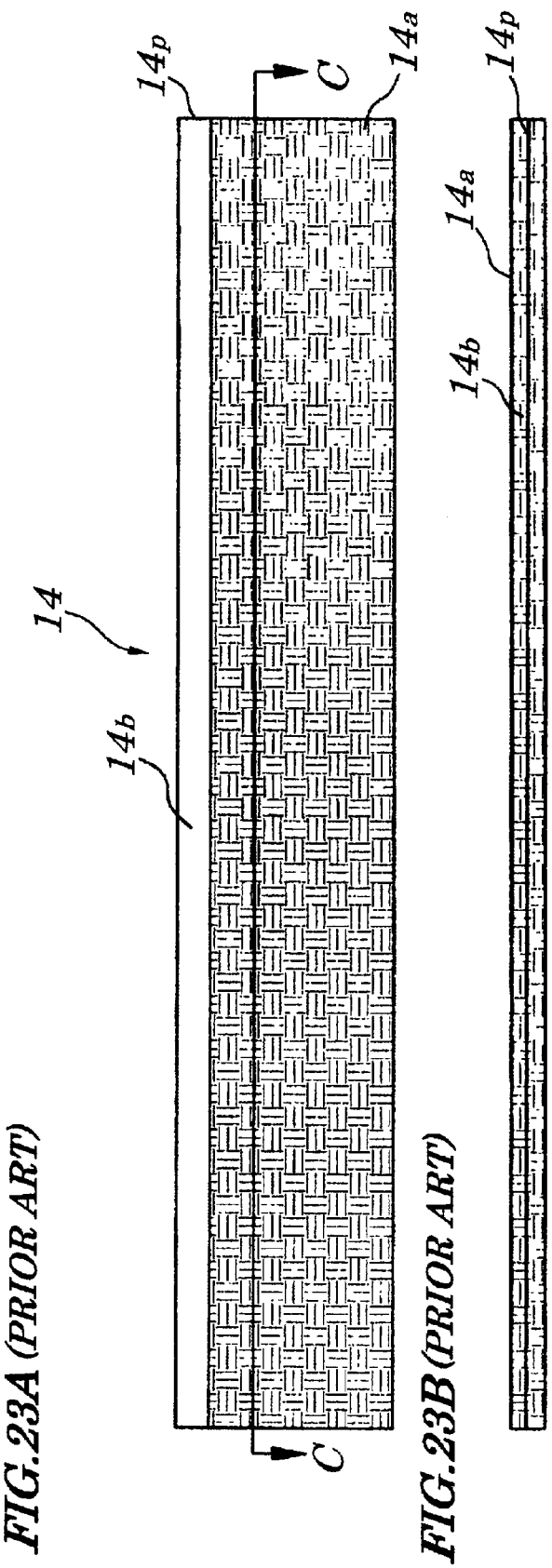
FIG. 23A and FIG. 23B are views showing a process of manufacturing another conventional electrode-rolled battery.
Figures 24A, 24B:
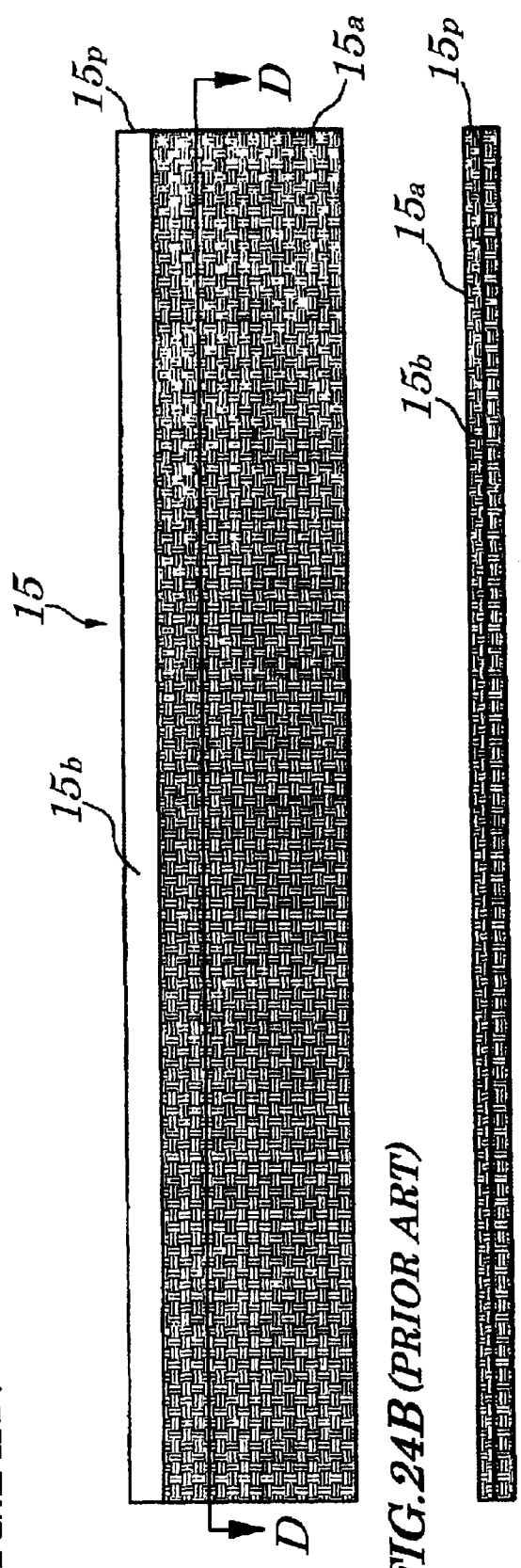
FIG. 24A and FIG. 24B are views showing a process of manufacturing the conventional electrode-rolled battery shown in FIG. 23A and 23B.
Figure 25:
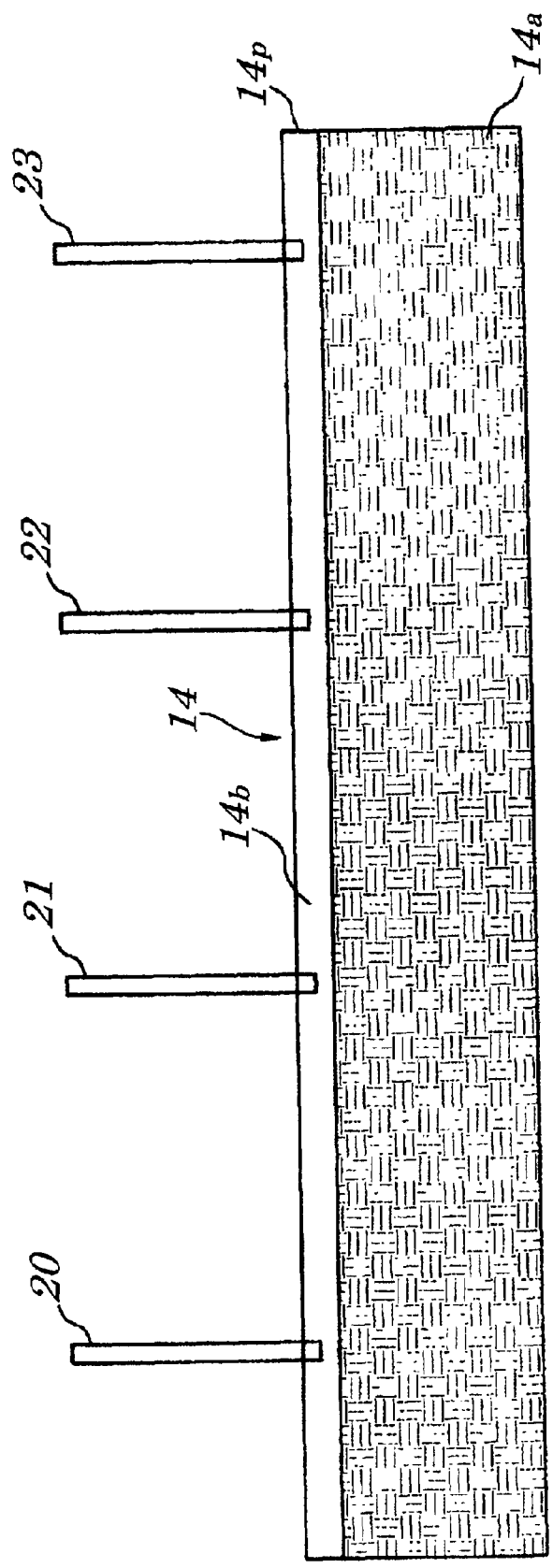
FIG. 25 is another view showing a process of manufacturing the conventional electrode-rolled battery shown in FIG. 23A and 23B.
Figure 26:
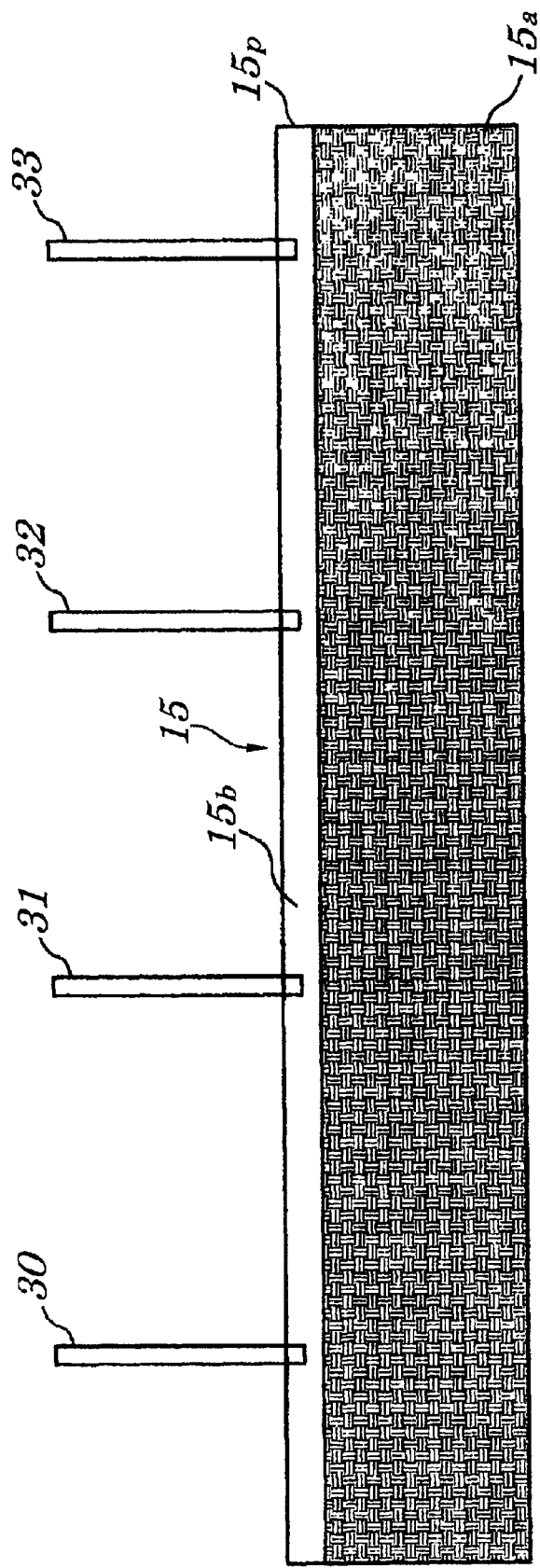
FIG. 26 is yet still another view showing a process of manufacturing the conventional electrode-rolled battery shown in FIG. 23A and 23B.

The rolled body 40 is not precisely cylindrical in fact and is a distorted cylinder. Since the anode 41, the cathode 42, and the separator 43 are thin (for example, the anode 41 and the cathode 42 are between several-tens of microns and several-hundreds of microns and the separator 43 is several-tens of microns), it is possible to approach a precise cylinder. Thus, the anode 41, the cathode 42, and the separator 43 are rolled using a central axis "O" as a start point so as to form the rolled body 40. As shown in FIG. 2A, a maximum value "R" of a radius of the rolled body 40 is set in a case anode active material unformed parts of the anode 41 appear on the periphery. Further, as shown in FIG. 2B, in the anode 41, anode active material forming parts 41a are intermittently formed in a longitudinal direction of a band-shaped current collector 41p. The tab 50, the tab 51, the tab 52, and the tab 53 are respectively connected to anode active material unformed parts 41b between the anode active material forming parts 41a. Respectively the anode active material unformed parts 41b are formed at regular intervals and have a same length "L2". Also, the tab 50, the tab 51, the tab 52, and the tab 53 are respectively connected to the same positions of the anode active material unformed parts 41b. The cathode 42 is formed approximately similarly to a conventional cathode 12 shown in FIG. 16.

Figure 3:
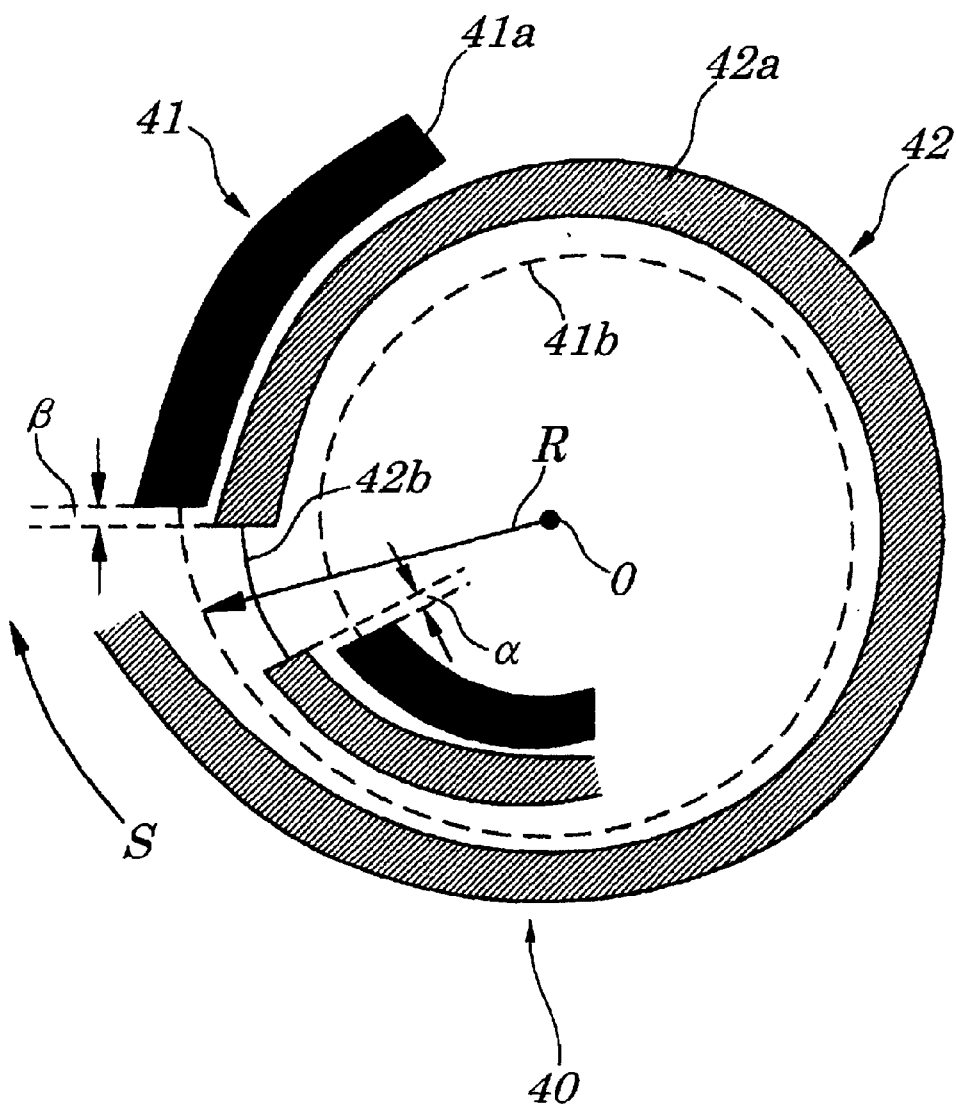
FIG. 3 is a view showing an essential part of a rolled body 40 indicated by an arrow A shown in FIG. 1.

FIG. 3 is a view showing an essential part of the rolled body 40 indicated by the arrow A shown in FIG. 1.

In the rolled body 40, as shown in FIG. 3, the anode 41 and the cathode 42 are rolled in a rolling direction "S" so that the separator 43 (not shown) is put between the anode 41 and the cathode 42. Further, a deviation "α" is set between a start point of the anode active material unformed part 41b and a start point of a cathode active material unformed part 42b which is opposite to the anode active material unformed part 41b, and a deviation "β" is set between an end point of a anode active material unformed part 41b and an end point of the cathode active material unformed part 42b which is opposite to the anode active material unformed part 41b. Thus, the length "L2" of each anode active material unformed part 41b is set as follows:

$$L2 \geq 2\pi R \text{(for example, } L2 = 2\pi R + \alpha + \beta),$$

Where a distance from an outermost anode active material unformed part 41b to a center of the rolled body 40 made up of the anode 41, the cathode 42 and the separator 43, is set as "R", and where the deviation "α" and the deviation "β" are set 5 mm to 7 mm when the diameter (=2R) of the rolled body 40, for example, is 33 mm. In a lithium ion secondary battery, when there is no anode active material a cathode surface which is opposite to the anode active material via the separator, Li+ iron deposits as metal lithium on the electrode surface of the cathode, and therefore, the deviation "α" and the deviation "β" are margins set to prevent metal lithium from depositing.

Figure 12:
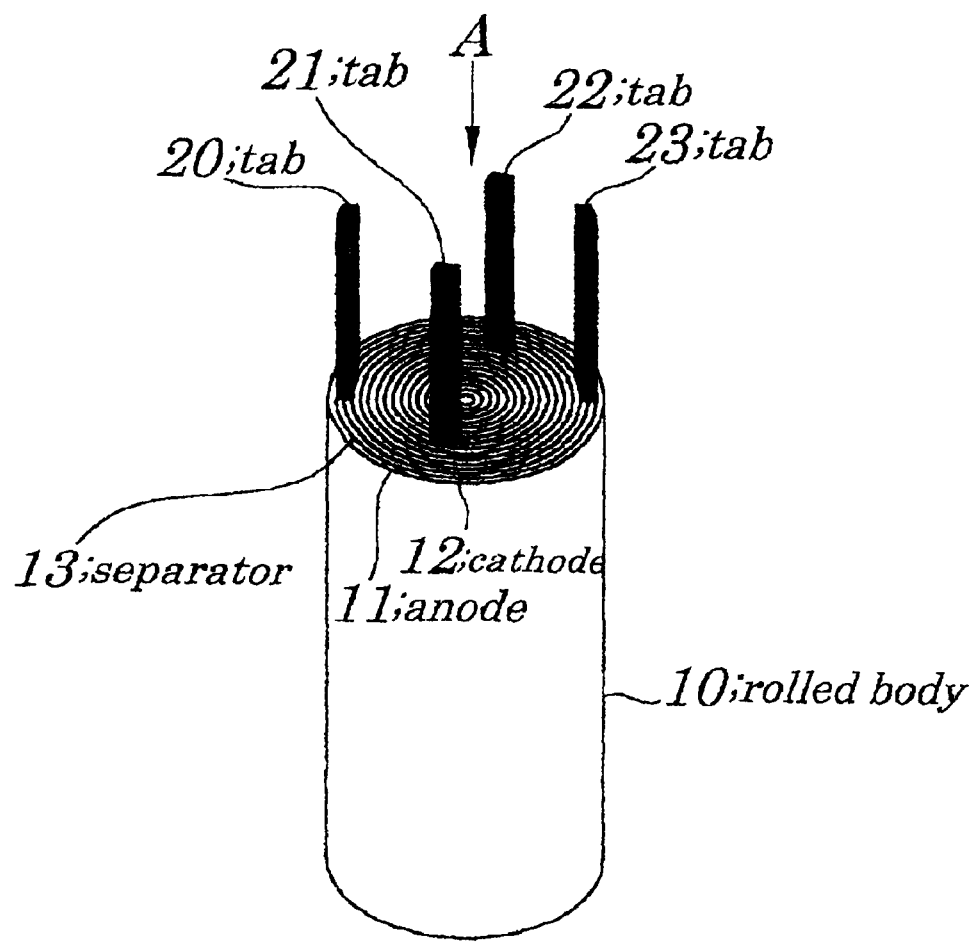
FIG. 12 is a perspective view showing a conventional electrode-rolled battery.

In a case of the lithium ion secondary battery, the electrode-rolled battery is represented by, similarly to the conventional electrode-rolled battery shown in FIG. 12, for example,

$$(-)Cn|LiPF_6-PC/DEC|Li1+y\ Mn_2O_4(+),$$

where $LiPF_6$ is fluophosphoric lithium, PC is propylene carbonate (electrolyte) and DEC is diethyl carbonate (electrolyte).

A battery reaction is represented by:

Charge

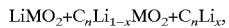
$$LiMO_2 + C_nLi_{1-x}MO_2 + C_nLi_x,$$

Discharge or

Charge

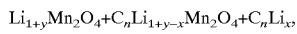
$$Li_{1+y}Mn_2O_4 + C_nLi_{1+y-x}Mn_2O_4 + C_nLi_x,$$

Discharge where $LiMO_2$ is lithium metallic oxide (anode active material), "M" is Co, Ni or Fe and "$C_n$" is carbon material (cathode active material).

FIG. 4A to FIG. 10 are process diagrams for explaining a method of manufacturing the electrode-rolled battery shown in FIG. 1.

Manufacturing process (1) to manufacturing process (8) of the electrode-rolled battery shown in FIG. 1 will be explained with reference to FIG. 4A to FIG. 10.

(1) Process is shown in FIG. 4A and FIG. 4B (Anode manufacturing process).

As shown in FIG. 4A, anode active material forming parts 41a are intermittently provided on one side of the band-shaped current collector 41p in the longitudinal direction. In this case, anode active material is made in paste and is coated on the band-shaped current collector 41p. Parts in addition to the anode active material forming parts 41a are the anode active material unformed parts 41b. A length of each anode active material unformed part 41b is set to "L2". Similarly, the anode active material forming parts 41a are intermittently provided on another side of the band-shaped current collector 41p in the longitudinal direction. As shown in FIG. 4B which is a sectional view of FIG. 4A taken along a line E—E, an anode 41 is manufactured in a manner that the anode active material forming parts 41a are formed on both sides of the band-shaped current collector 41p.

Figure 5A:
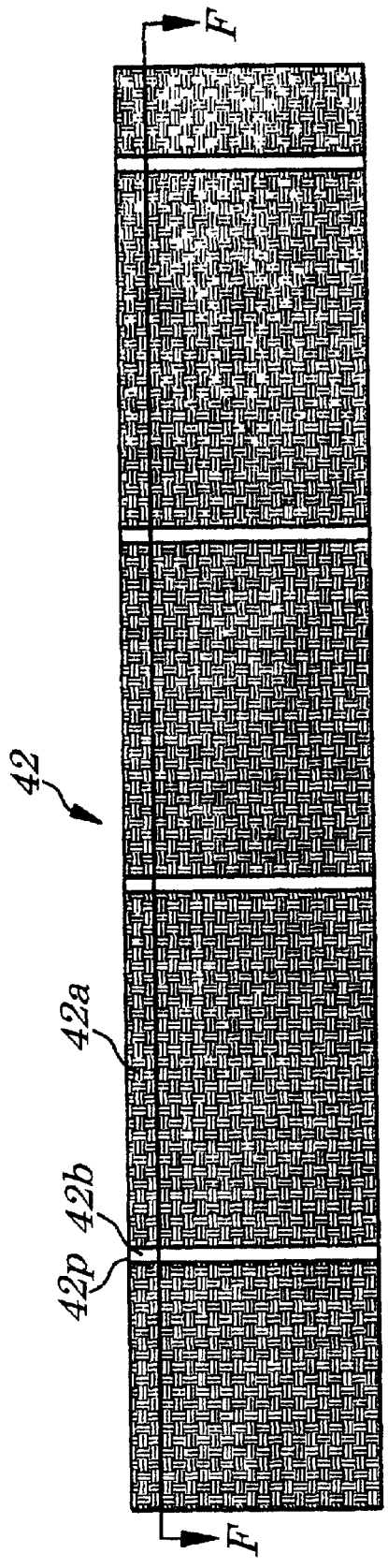
FIG. 5A and FIG. 5B are views showing a process of manufacturing a cathode.
Figure 5B:
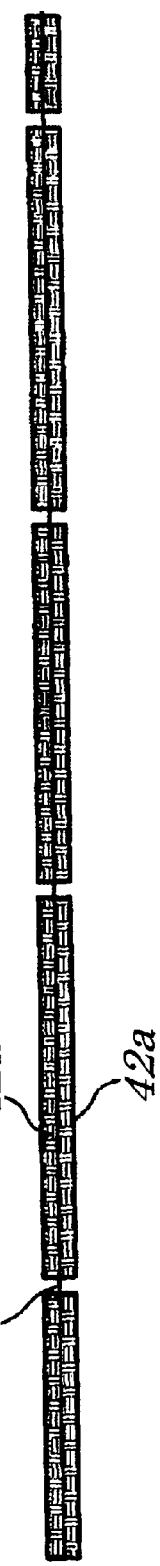

(2) Process is shown in FIG. 5A and FIG. 5B (Cathode manufacturing process).

As shown in FIG. 5A, cathode active material forming parts 42a are intermittently provided on one side of the band-shaped current collector 42p in the longitudinal direction. In this case, anode active material is made in paste and is coated on the band-shaped current collector 41p. Parts in addition to the cathode active material forming parts 42a are cathode active material unformed parts 42b. Similarly, the cathode active material forming part 42a, the cathode active material forming parts 42a are intermittently provided on another side of the band-shaped current collector 42p in the longitudinal direction. As shown in FIG. 5B which is a sectional view of FIG. 5A taken along a line F—F, an anode 42 is manufactured in a manner that the cathode active material forming parts 42a are formed on both sides of the band-shaped current collector 42p.

Figure 6:
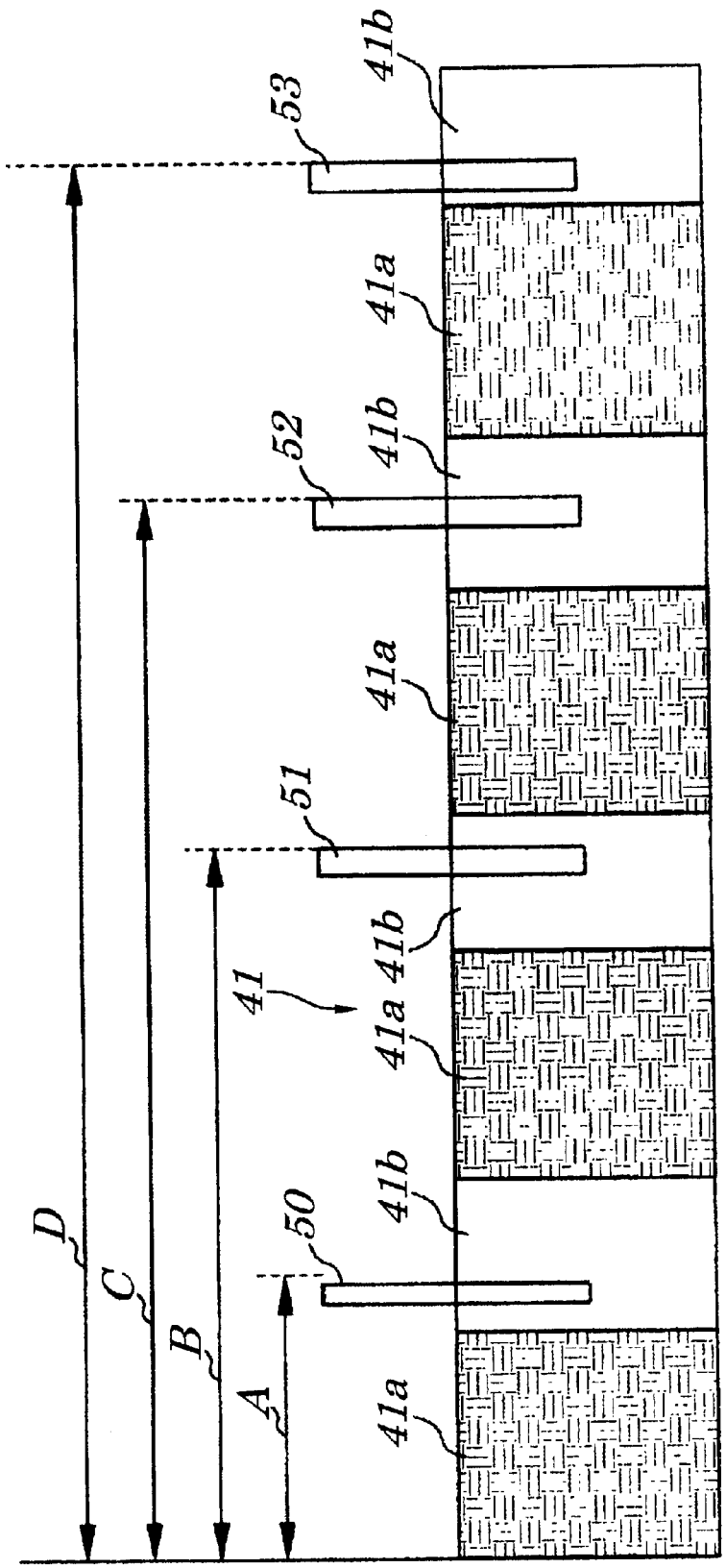
FIG. 6 is a view showing a process of connecting tabs.

(3) Process is shown in FIG. 6 (Tab connecting process).

The tab 50, the tab 51, the tab 52, and the tab 53 are respectively connected to the anode active material unformed parts 41b, for example, by ultrasonic welding. In this case, a distance "A", a distance "B", a distance "C", and a distance "D" between one end of the anode 41 and respective ends of the tab 50, the tab 51, the tab 52, and the tab 53 are calculated and set so that tab 50, the tab 51, the tab 52, and the tab 53 are arranged regularly, for example, the tab 50, the tab 51, the tab 52, and the tab 53 are pulled in a line in a radius direction of the rolled body 40 when the rolled body 40 is manufactured or the tab 50, the tab 51, the tab 52, and the tab 53 are pulled so that they are equally dispersed on a circumference of the rolled body 40.

Figure 7:
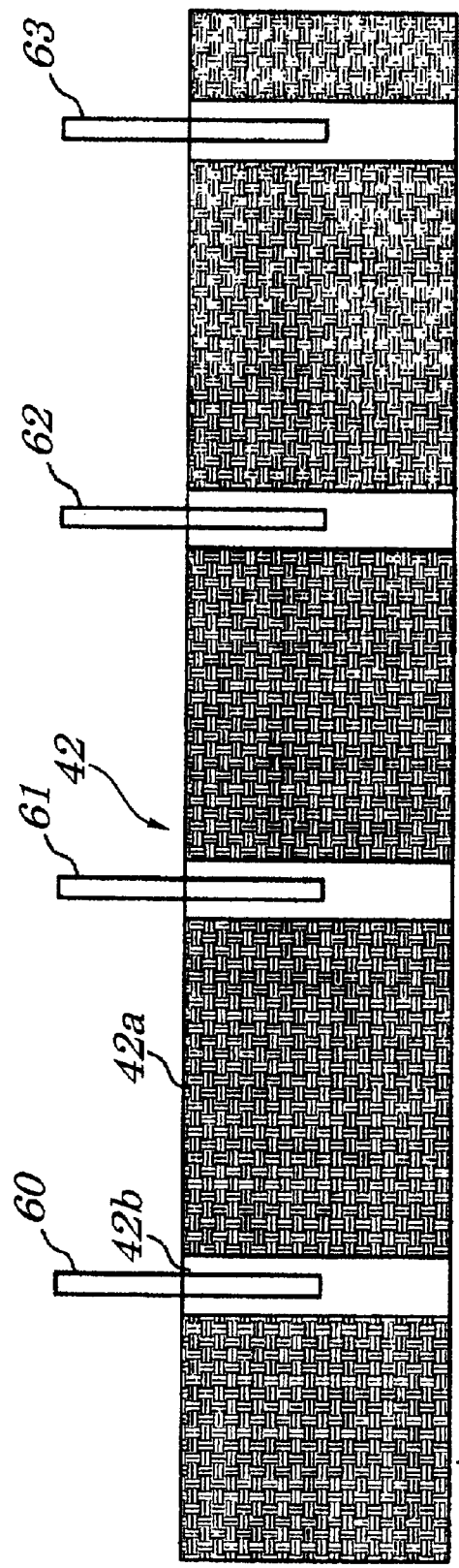
FIG. 7 is another view showing a process of connecting tabs.

(4) Process is shown in FIG. 7 (Tab connecting process).

A tab 60, a tab 61, a tab 62, and a tab 63 are respectively connected to the cathode active material unformed parts 42b, for example, by ultrasonic welding.

Figure 8:
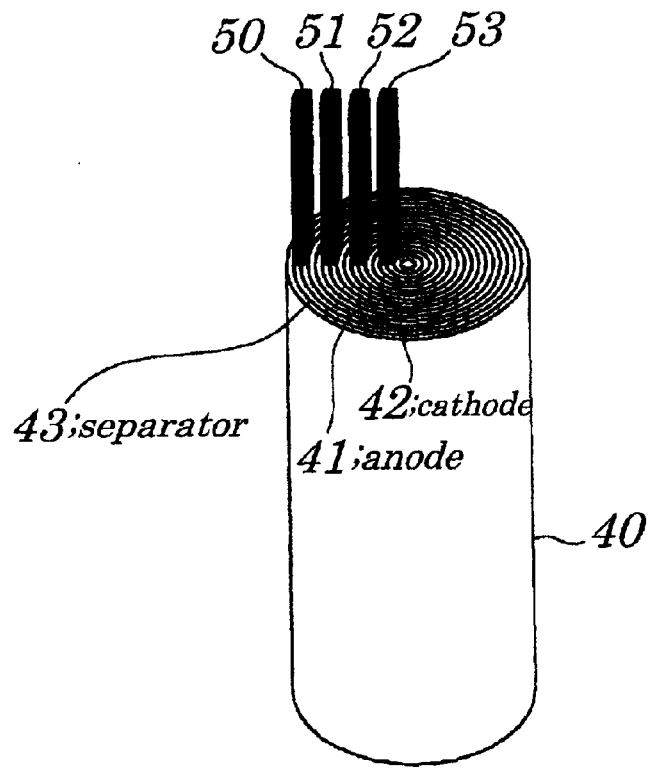
FIG. 8 is a view showing a process of rolling.

(5) Process is shown in FIG. 8 (Rolling Process).

A separator 43 is put between the anode 41 and the cathode 42 and they are rolled by a rolling apparatus so as to manufacture the rolled body 40. Incidentally, the tab 60, the tab 61, the tab 62, and the tab 63 are not shown since they are pulled out from another side not a side from which the tab 50, the tab 51, the tab 52, and the tab 53 are pulled out.

Figure 9:
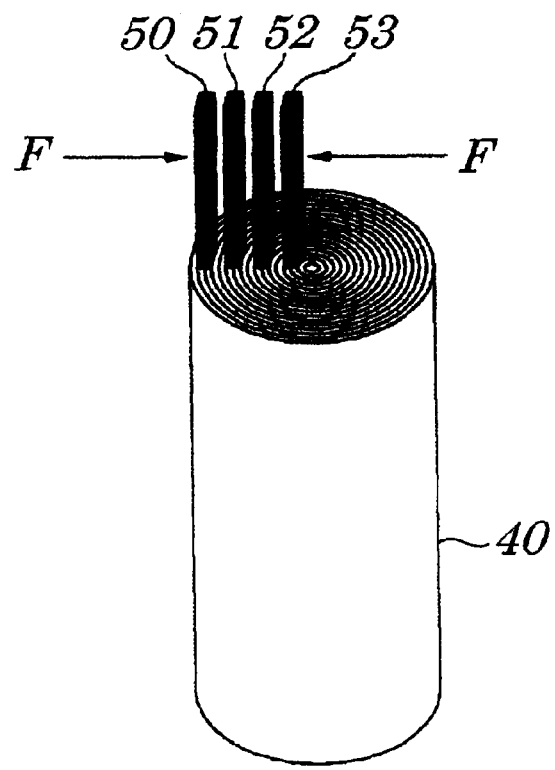
FIG. 9 is a view showing a process of gathering first tabs.

(6) Process is shown in FIG. 9 (First tab gathering process and second tab gathering process).

The tab 50, the tab 51, the tab 52, and the tab 53 are gathered by an operation F such as a tab gathering apparatus. Similarly, the tab 60, the tab 61, the tab 62, and the tab 63 (not shown) are gathered.

Figure 10:
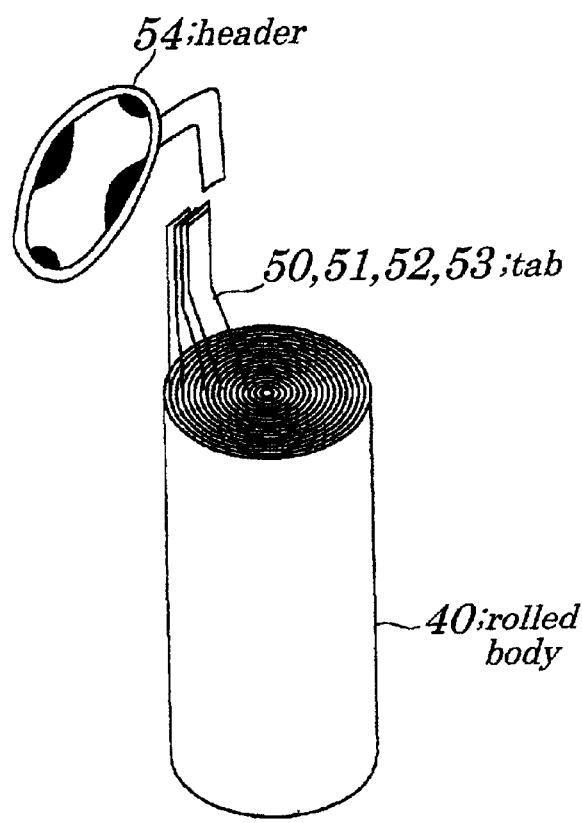
FIG. 10 is a view showing a process of connecting a header.

(7) Process is shown in FIG. 10 (Header connecting process).

A collecting header 54 is connected to the tab 50, the tab 51, the tab 52, and the tab 53 by an operation such as a header connecting apparatus, for example, by ultrasonic welding. Similarly, a (not shown) header is connected to the tab 60, the tab 61, the tab 62, and the tab 63 which are also not shown. Then, the rolled body 40 is stored in a cylindrical case (not shown).

Figure 11:
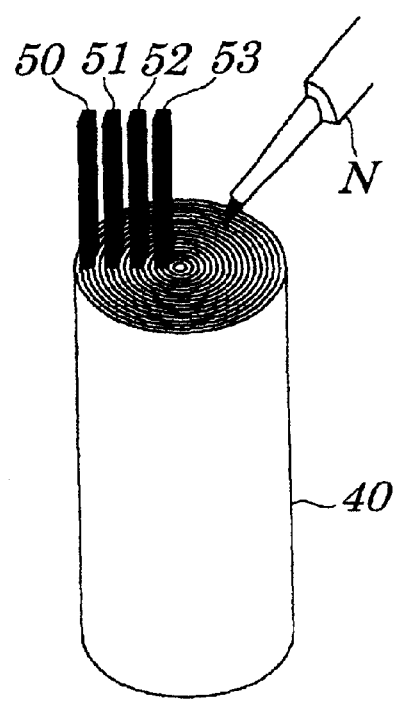
FIG. 11 is a view showing a process of injecting electrolyte.

(8) Process is shown in FIG. 11 (Electrolyte injecting process).

Electrolyte is injected by an electrolyte injecting apparatus (such an electrolyte injecting as nozzle) N in a direction from which the tab 50, the tab 51, the tab 52, and the tab 53 are pulled out, and then the electrode-rolled battery is completed. Incidentally, the header 54 is not shown in FIG. 11.

Figure 13A:
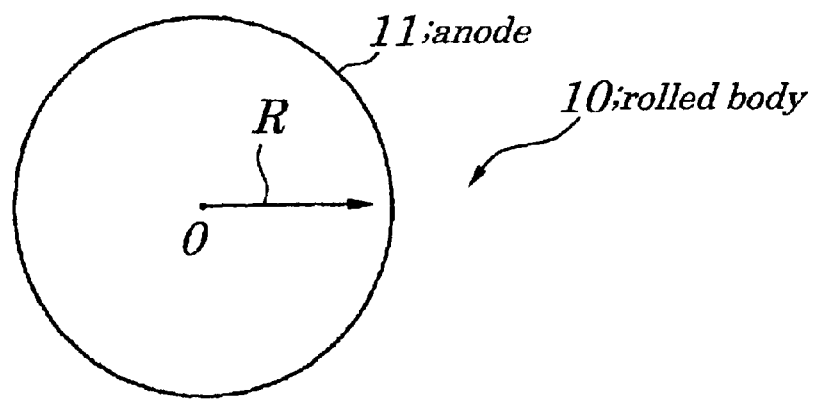
FIG. 13A and FIG. 13B are views showing an anode 11 shown in FIG. 12.
Figure 13B:
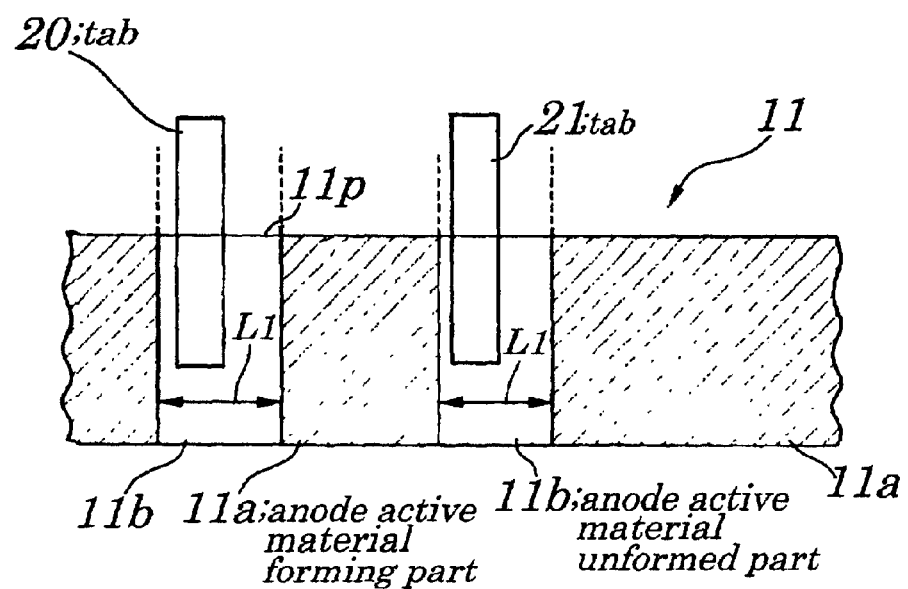
Figure 14:
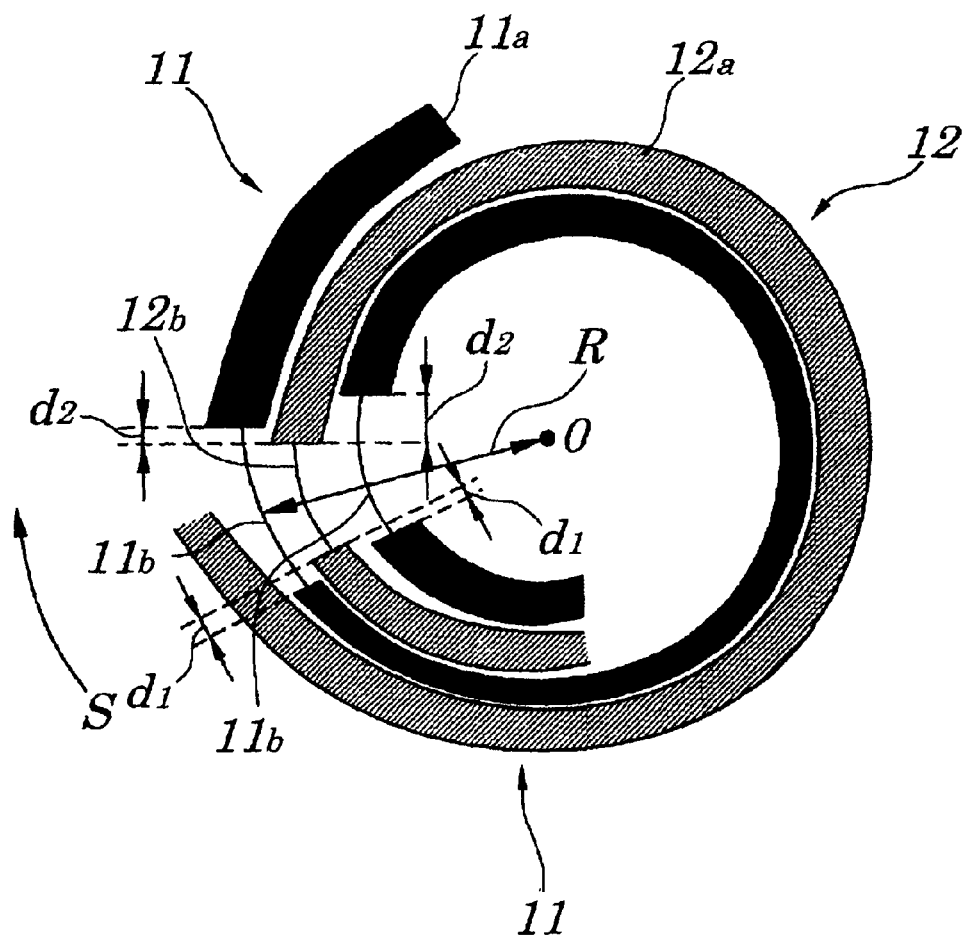
FIG. 14 is a view showing an essential part of a rolled body 10 indicated by an arrow A shown in FIG. 12.
Figures 15A, 15B:
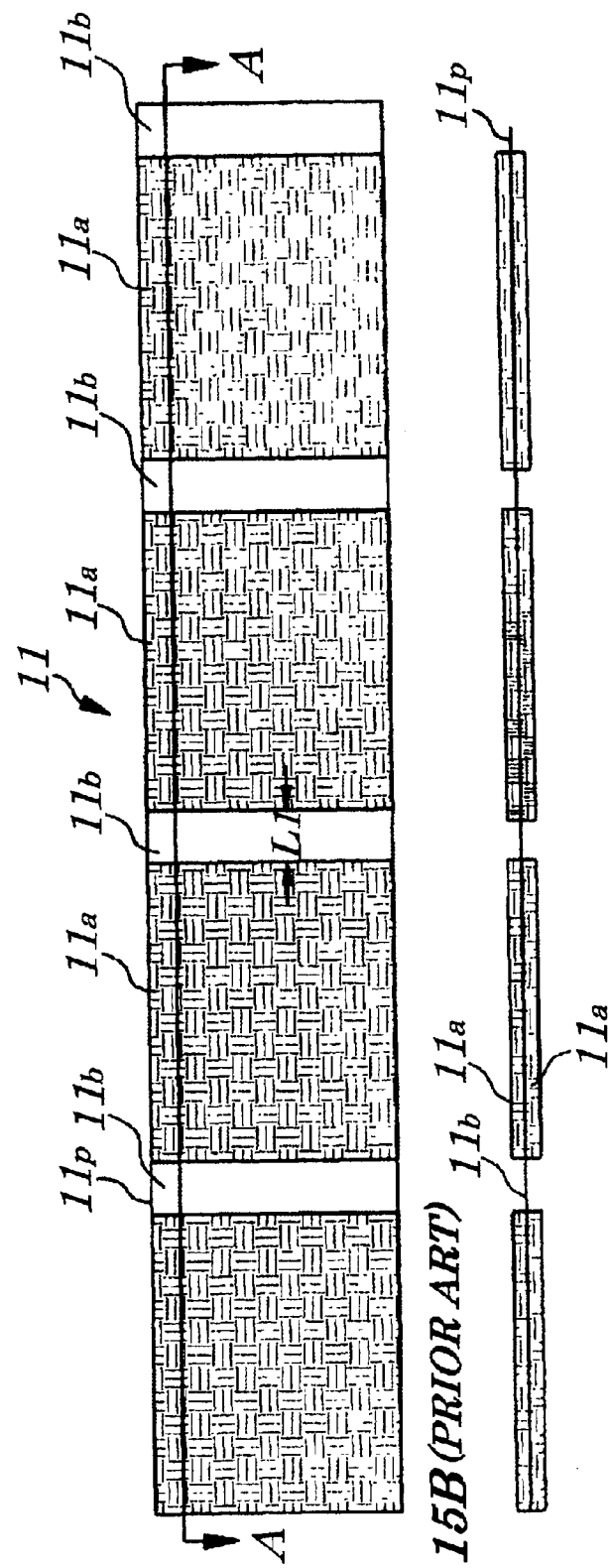
FIG. 15A and FIG. 15B are views showing a process of manufacturing the electrode-rolled battery shown in FIG. 12.

As to the electrode-rolled battery manufactured by the method according to this embodiment, in comparison with the conventional electrode-rolled battery having a same appearance shown in FIG. 12, a total area of the anode active material forming parts 41a is smaller than that of the anode active material forming parts 11a in FIG. 13B. Therefore, it is expected that a rating capacity of the electrode-rolled battery according to this embodiment reduces in comparison with the conventional electrode-rolled battery, however, when a diameter is 33 mm and a height is 100 mm, the rating capacity reduces 0.875% compared with the conventional rating capacity 5Ah. Therefore, it is possible to obtain the rating capacity since the reducing rate is of no consequence.

As described above, according to this embodiment, since the length "L2" of the anode active material unformed part 41b is set as follows:

$$L \geq 2\pi R (\text{for example}, L=2R+\alpha+\beta),$$

the tab 50, the tab 51, the tab 52, and the tab 53 are arranged regularly, for example, the tab 50, the tab 51, the tab 52, and the tab 53 are pulled in a line in a diameter direction of the rolled body 40 or are equally dispersed on the circumference of the rolled body 40. Therefore, the process of gathering the tab 50, the tab 51, the tab 52, and the tab 53 (first tab gathering process) and the process of connecting the tab 50, the tab 51, the tab 52, and the tab 53 to the header 54 (header connecting process) are performed by apparatuses and are made simple compared with the conventional technique. Further, in the process of injecting electrolyte to the rolled body 40 (electrolyte injecting process), the electrolyte injecting nozzle N is easily inserted, and therefore, the operation is easier than the conventional technique.

Further, since it is possible to set the tab 50, the tab 51, the tab 52, and the tab 53 at any position, it is possible to set an internal impedance of the rolled body 40 small. Therefore, though a large current is continuously supplied from the electrode-rolled battery to a load, there is no case in that the rolled body 40 heats and the electrolyte degrades, and therefore, the cycle lifetime characteristic of the electrode-rolled battery improves in comparison with the conventional electrode-rolled battery. Also, it is possible to set the tab 50, the tab 51, the tab 52, and the tab 53 freely, and therefore, though in the anode 41, the anode active material forming parts 41a are positioned so that the tab 50, the tab 51, the 52, and the tab 53 are pulled in a line in the diameter direction of the rolled body 40, it is possible to manufacture an electrode-rolled battery based on an original design without influences of parameters such as the thickness accuracy of the anode 41, the thickness accuracy of the cathode 42 or the rolling force of the rolling apparatus.

It is thus apparent that the present invention is not limited to the above embodiments but may be changed and modified without departing from the scope and spirit of the invention.

For example, manufacturing the anode active material forming part 41a is not limited to coating active material, and any technique such as burning or spattering if only the cathode active material forming part 41a is formed.

Also, when the tab 50, the tab 51, the tab 52 and the tab 53 are connected to the anode active material unformed parts 41b and when the collecting header 54 is connected to the tab 50, the tab 51, the tab 52, and the tab 53 by any technique such as resistance welding and caulking in addition to ultrasonic welding.

Also, in the first tab gathering process, the tab 50, the tab 51, the tab 52, and the tab 53 may be gathered by a manual operation of an operator. In this case, since the tab 50, the tab 51, the tab 52, and the tab 53 are arranged regularly, the gathering operation can be easily compared with the conventional process.

Also, in this embodiment, the outermost anode active material unformed part 41b of the anode 41 is provided on the most-peripheral surface of the rolled body 40, to the contrary, when the outermost cathode active material unformed part 42b of the-cathode 42 is provided on the most-peripheral surface of the rolled body 40, this invention is applied to the outermost anode active material unformed part 41b in an inside of the most-peripheral surface of the roller body 40.

Furthermore, this invention is available for all electrode-rolled batteries, and not limited only to lithium ion secondary batteries.

What is claimed is:

1. An electrode-rolled battery in which an anode and a cathode are rolled in a manner that a separator is put between said anode and said cathode and in which a plurality of collecting tabs is respectively connected with a plurality of anode active material unformed parts of said anode and a plurality of cathode active material unformed parts of said cathode; and wherein when a length of an outermost anode active material unformed part is set as "L"; and when a distance from said outermost anode active material unformed part to a center of a rolled body made up of said anode, said cathode and said separator, is set as "R", a following expression is set:

$$L \geq 2\pi R.$$

2. The electrode-rolled battery according to claim 1, wherein each of said collecting tabs is arranged regularly on an end face of said rolled body.

3. An electrode-rolled battery in which an anode and a cathode are rolled in a manner that a separator is put between said anode and said cathode and in which a plurality of collecting tabs is respectively connected with a plurality of anode active material unformed parts and a plurality of cathode active material unformed parts; and wherein when a length of an outermost anode active material unformed part is set as "L"; and when a distance from said outermost anode active material unformed part to a center of a rolled body made up of said anode, said cathode and said separator, is set as "R", when a deviation between a start point of said outermost anode active material unformed part and a start point of a outermost cathode active material forming part which is opposite to said outermost anode active material unformed part is set as "α", and when a deviation between an end point of said outermost anode active material unformed part and an end point of said outermost cathode active material forming part which is opposite to said outermost anode active material unformed part is set as "β", a following expression is set:

$$L=2\pi R+\alpha+\beta.$$

4. The electrode-rolled battery according to claim 3, wherein each of said collecting tabs is arranged regularly on an end face of said rolled body.

5. An electrode-rolled battery comprising:
an anode having a first band-shaped current collector and intermittently having anode active material forming parts on both sides of said first band-shaped current collector in a longitudinal direction;
a cathode having a second band-shaped current collector and intermittently having cathode active material forming parts on both sides of said first band-shaped current collector in a longitudinal direction;
a plurality of first collecting tabs formed in said anode active material unformed parts of said first band-shaped current collector;
a plurality of second collecting tabs formed in said cathode active material unformed parts of said second band-shaped current collector; and
a separator put between said cathode and said anode;
said electrode-rolled battery in which said anode, said cathode and said separator are rolled; and
wherein when a length of an outermost anode active material unformed part is set as "L"; and when a distance from said outermost anode active material unformed part to a center of a rolled body made up of said anode, said cathode and said separator, is set as "R", when a deviation between a start point of said outermost anode active material unformed part and a start point of a outermost cathode active material forming part which is opposite to said outermost anode active material unformed part is set as "α", and when a deviation between an end point of said outermost anode active material unformed part and an end point of said outermost cathode active material forming part which is opposite to said outermost anode active material unformed part is set as "β", a following expression is set:

$$L \geq 2\pi R.$$

6. The electrode-rolled battery according to claim 5, wherein each of said collecting tabs is arranged regularly on an end face of said rolled body.

7. An electrode-rolled battery comprising:
an anode having a first band-shaped current collector and intermittently having anode active material forming parts on both sides of said first band-shaped current collector in a longitudinal direction;
a cathode having a second band-shaped current collector and intermittently having cathode active material forming parts on both sides of said second band-shaped current collector in a longitudinal direction;
a plurality of first collecting tabs formed in said anode active material unformed parts of said anode;
a plurality of second collecting tabs formed in said cathode active material unformed parts of said cathode; and
a separator put between said cathode and said anode:
said electrode-rolled battery in which said cathode, said anode and said separator are rolled; and
wherein when a length of an outermost anode active material unformed part is set as "L"; and when a distance from said outermost anode active material unformed part to a center of a rolled body made up of said anode, said cathode and said separator, is set as "R", when a deviation between a start point of said outermost anode active material unformed part and a start point of a outermost cathode active material forming part which is opposite to said outermost anode active material unformed part is set as "α", and when a deviation between an end point of said outermost anode active material unformed part and an end point of said outermost cathode active material forming part which is opposite to said outermost anode active material unformed part is set as "β", a following expression is set:

$$L=2R+\alpha+\beta.$$

8. The electrode-rolled battery according to claim 7, wherein each of said collecting tabs is arranged regularly on an end face of said rolled body.

9. A method of manufacturing an electrode-rolled battery comprising rolling an anode and a cathode in a manner that a separator is put between said anode and said cathode;
connecting a plurality of collecting tabs with a plurality of cathode active material unformed parts and a plurality of anode active material unformed parts; and
setting parameters such that when a length of an outermost anode active material unformed part is set as "L"; and when a distance from said outermost anode active material unformed part to a center of a rolled body made up of said anode, said cathode and said separator, is set as "R", a following expression is set:

$$L \geq 2\pi R.$$

10. The method according to claim 9, wherein each of said collecting tabs is arranged regularly on an end face of said rolled body.

11. A method of manufacturing an electrode-rolled battery comprising rolling an anode and a cathode in a manner that a separator is put between said anode and said cathode;
connecting a plurality of collecting tabs with a plurality of anode active material unformed parts and a plurality of cathode active material unformed parts; and
setting parameters such that when a length of an outermost anode active material unformed part is set as "L"; and when a distance from said outermost anode active material unformed part to a center of a rolled body made up of said anode, said cathode and said separator, is set as "R", when a deviation between a start point of said outermost anode active material unformed part and a start point of a outermost cathode active material forming part which is opposite to said outermost anode active material unformed part is set as "α", and when a deviation between an end point of said outermost anode active material unformed part and an end point of said outermost cathode active material forming part which is opposite to said outermost anode active material unformed part is set as "β", a following expression is set:

$$L=2\pi R+\alpha+\beta.$$

12. The method according to claim 11, wherein each of said collecting tabs is arranged regularly on an end face of said rolled body.

13. A method of manufacturing an electrode-rolled battery comprising:
- an anode forming process of forming an anode by intermittently forming anode active material forming parts on both sides of a first band-shaped current collector in a longitudinal direction;
- a cathode forming process of forming a cathode by intermittently forming cathode active material forming parts on both sides of a second band-shaped current collector in a longitudinal direction;
- a connecting process of connecting a plurality of first collecting tabs to anode active material unformed parts of said first band-shaped current collector and of connecting a plurality of second collecting tabs to cathode active material unformed parts of said second band-shaped current collector;
- a rolling process of rolling said cathode and said anode, and a separator which is put between said cathode and said anode;
- a first tab gathering process of gathering each of said first collecting tabs;
- a header connecting process of connecting a collecting header to said first collecting tabs which are gathered;
- a second tab gathering process of gathering each of said second collecting tabs;
- an electrolyte injecting process of injecting electrolyte into said rolled body using an electrolyte injecting apparatus:
- wherein when a length of an outermost anode active material unformed part is set as "L"; and when a distance from said outermost anode active material unformed part to a center of a rolled body made up of said anode, said cathode and said separator, is set as "R", a following expression is set:

$$L \geq 2\pi R.$$

14. The method according to claim 13, wherein each of said collecting tabs is arranged regularly on an end face of said rolled body.

15. A method of manufacturing an electrode-rolled battery comprising:
- an anode forming process of forming an anode by intermittently forming anode active material forming parts on both sides of a first band-shaped current collector in a longitudinal direction;
- a cathode forming process of forming a cathode by intermittently forming cathode active material forming parts on both sides of a second band-shaped current collector in a longitudinal direction;
- a connecting process of connecting a plurality of first collecting tabs to anode active material unformed parts of said first band-shaped electrode and of connecting a plurality of second collecting tabs to cathode active material unformed parts of said second band-shaped electrode;
- a rolling process of rolling said cathode and said anode, and a separator which is put between said cathode and said anode;
- a first tab gathering process of gathering each of said first collecting tabs;
- a header connecting process of connecting a collecting header to said first collecting tabs which are gathered;
- a second tab gathering process of gathering each of said second collecting tabs;
- an electrolyte injecting process of injecting electrolyte into said rolled body using an electrolyte injecting apparatus:
- wherein when a length of an outermost anode active material unformed part is set as "L"; and when a distance from said outermost anode active material unformed part to a center of a rolled body made up of said anode, said cathode and said separator, is set as "R", when a deviation between a start point of said outermost anode active material unformed part and a start point of a outermost cathode active material forming part which is opposite to said outermost anode active material unformed part is set as "α", and when a deviation between an end point of said outermost anode active material unformed part and an end point of said outermost cathode active material forming part which is opposite to said outermost anode active material unformed part is set as "β", a following expression is set:

$$L = 2\pi R + \alpha + \beta.$$

16. The method according to claim 15, wherein each of said collecting tabs is arranged regularly on an end face of said rolled body.

* * * * *

UNITED STATES PATENT AND TRADEMARK OFFICE
CERTIFICATE OF CORRECTION

PATENT NO. : 6,746,796 B2
APPLICATION NO. : 09/989659
DATED : June 8, 2004
INVENTOR(S) : Hideto Watanabe and Hiromi Suzuki It is certified that error appears in the above-identified patent and that said Letters Patent is hereby corrected as shown below:

Column 16, Line 21, delete "$L=2R+\alpha+\beta$", insert --$L=2\pi R+\alpha+\beta$--

Signed and Sealed this

Twenty-seventh Day of May, 2008

JON W. DUDAS
*Director of the United States Patent and Trademark Office*